United States Patent
Ericksen et al.

(10) Patent No.: US 12,065,214 B2
(45) Date of Patent: Aug. 20, 2024

(54) WIRELESS ACTIVE SUSPENSION SYSTEM

(71) Applicant: Fox Factory, Inc., Duluth, GA (US)

(72) Inventors: Everet Owen Ericksen, Woodland, CA (US); Andrew Diao, Santa Cruz, CA (US); Mike Fraguglia, Santa Cruz, CA (US); Evan Peterson, Santa Cruz, CA (US); James T. Pickett, Santa Cruz, CA (US); Christian Jonathan Steven Wright, Huntington (NZ); Dean Armstrong, Chartwell (NZ)

(73) Assignee: Fox Factory, Inc., Duluth, GA (US)

( * ) Notice: Subject to any disclaimer, the term of this patent is extended or adjusted under 35 U.S.C. 154(b) by 216 days.

(21) Appl. No.: 17/561,035

(22) Filed: Dec. 23, 2021

(65) Prior Publication Data
US 2022/0204121 A1 Jun. 30, 2022

Related U.S. Application Data

(60) Provisional application No. 63/131,259, filed on Dec. 28, 2020.

(51) Int. Cl.
*B62K 23/02* (2006.01)
*B62J 45/20* (2020.01)
(Continued)

(52) U.S. Cl.
CPC ............. *B62K 23/02* (2013.01); *B62J 45/20* (2020.02); *B62J 50/22* (2020.02); *B62K 2025/044* (2013.01); *B62K 2025/045* (2013.01)

(58) Field of Classification Search
CPC ...... F16F 2230/08; F16F 2230/18; F16F 9/18; B62K 2025/044; B62K 2025/045; B62K 23/02; B62K 25/04; B62J 45/20; B62J 45/414; B62J 45/423; B62J 50/22; B60G 17/019; B60G 17/01908; B60G 2204/112; B60G 2206/41; B60G 2300/12; B60G 2400/102; B60G 2400/208;
(Continued)

(56) References Cited

U.S. PATENT DOCUMENTS 5,432,790 A * 7/1995 Hluchyj ............. H04L 12/5602
370/468
5,971,116 A * 10/1999 Franklin ................. F16F 9/346
188/266.2
(Continued)

FOREIGN PATENT DOCUMENTS

EP 2905157 A1 8/2015

OTHER PUBLICATIONS

Bluetooth Pan Profile V10 2003 (Year: 2003).*
(Continued)

*Primary Examiner* — Carl C Staubach

(57) ABSTRACT

A wireless active suspension system is disclosed. The system includes at least one sensor mounted to an unsprung mass of a vehicle, the sensor having a low power wireless communication capability, the at least one sensor to send a sensor data transmission. The system also includes a controller in wireless communication with the at least one sensor, wherein the controller receives the sensor data from the at least one sensor and communicates an adjustment command to modify at least one damping characteristic of at least one damper.

20 Claims, 12 Drawing Sheets

(51) Int. Cl.
*B62J 50/22* (2020.01)
*B62K 25/04* (2006.01)

(58) Field of Classification Search
CPC .......... B60G 2400/252; B60G 2400/52; B60G 2400/82; B60G 2500/11; B60G 2600/0422; B60G 2600/71; B60G 2600/76; B60G 2800/16; B60G 2800/98
See application file for complete search history.

(56) References Cited

U.S. PATENT DOCUMENTS

| | | | |
|---|---|---|---|
| 6,498,967 B1 * | 12/2002 | Hopkins | B60G 17/0195 |
| | | | 702/140 |
| 7,002,984 B1 * | 2/2006 | Cheng | H04L 12/66 |
| | | | 370/468 |
| 7,374,028 B2 | 5/2008 | Fox | |
| 7,484,603 B2 | 2/2009 | Fox | |
| 7,995,034 B2 * | 8/2011 | Pope | G06F 1/3271 |
| | | | 713/320 |
| 8,627,932 B2 | 1/2014 | Marking | |
| 8,838,335 B2 | 9/2014 | Bass et al. | |
| 8,857,580 B2 | 10/2014 | Marking | |
| 8,955,653 B2 | 2/2015 | Marking | |
| 9,033,122 B2 | 5/2015 | Ericksen et al. | |
| 9,120,362 B2 | 9/2015 | Marking | |
| 9,239,090 B2 | 1/2016 | Marking et al. | |
| 9,303,712 B2 | 4/2016 | Cox | |
| 9,353,818 B2 | 5/2016 | Marking | |
| 9,452,654 B2 | 9/2016 | Ericksen et al. | |
| 9,593,521 B2 * | 3/2017 | Breed | B60R 16/037 |
| 9,623,716 B2 | 4/2017 | Cox | |
| 9,682,604 B2 | 6/2017 | Cox et al. | |
| 9,797,467 B2 | 10/2017 | Wootten et al. | |
| 10,036,443 B2 | 7/2018 | Galasso et al. | |
| 10,040,329 B2 | 8/2018 | Ericksen et al. | |
| 10,047,817 B2 | 8/2018 | Ericksen et al. | |
| 10,060,499 B2 | 8/2018 | Ericksen et al. | |
| 10,415,662 B2 | 9/2019 | Marking | |
| 10,443,671 B2 | 10/2019 | Marking | |
| 10,737,546 B2 | 8/2020 | Tong | |
| 10,933,710 B2 | 3/2021 | Tong | |
| 10,988,198 B2 * | 4/2021 | Komatsu | B62K 25/10 |
| 11,840,310 B2 * | 12/2023 | Takayama | B62M 6/45 |
| 2002/0075875 A1 * | 6/2002 | Dravida | H04L 47/10 |
| | | | 370/395.21 |
| 2010/0211253 A1 * | 8/2010 | Morais Dos Santos | |
| | | | G01M 17/04 |
| | | | 702/182 |
| 2013/0316649 A1 * | 11/2013 | Newham | H04W 88/04 |
| | | | 455/39 |
| 2014/0336524 A1 * | 11/2014 | Stewart | A61B 5/0024 |
| | | | 600/549 |
| 2018/0054688 A1 * | 2/2018 | Cartwright | H04S 7/30 |
| 2018/0152487 A1 * | 5/2018 | Griffin | H04L 12/1818 |
| 2018/0328442 A1 * | 11/2018 | Galasso | F16F 9/3264 |
| 2019/0092116 A1 * | 3/2019 | Magnus | B62K 25/08 |
| 2019/0184782 A1 * | 6/2019 | Shaw | F16F 9/46 |
| 2019/0287063 A1 * | 9/2019 | Skaaksrud | G08G 1/202 |
| 2020/0298925 A1 * | 9/2020 | Viner | B60W 30/143 |
| 2022/0210650 A1 * | 6/2022 | Ericksen | H04W 4/80 |
| 2022/0266939 A1 * | 8/2022 | Ericksen | B62J 45/412 |
| 2023/0081873 A1 * | 3/2023 | Ericksen | B60G 17/019 |
| | | | 280/5.515 |

OTHER PUBLICATIONS

Bluetooth Goep Spec V20 2010 (Year: 2010).*
European Search Report for European Application No. 212180 25.1, 10 pages, May 23, 2022.

* cited by examiner

WIRELESS ACTIVE SUSPENSION SYSTEM

CROSS-REFERENCE TO RELATED APPLICATIONS (PROVISIONAL)

This application claims priority to and benefit of U.S. Provisional Patent Application No. 63/131,259 filed on Dec. 28, 2020, entitled "WIRELESS ACTIVE SUSPENSION SYSTEM" by Ericksen et al., and assigned to the assignee of the present application, the disclosure of which is hereby incorporated by reference in its entirety.

FIELD OF THE INVENTION

Embodiments of the present technology relate generally to an active suspension system.

BACKGROUND

Vehicle suspension systems typically include a spring component or components and a damping component or components that form a suspension to provide for a comfortable ride, enhance performance of a vehicle, and the like. For example, a harder suspension is usually preferred on smooth terrain while a softer suspension is often the choice for an off-road environment. However, the suspension system is almost always a collection of compromises to obtain the "best" performance over a range of different possible encounters. Thus, as with every collection of compromises, an advancement in one area of a suspension system will often incur a new problem, set of problems, or performance changes/capabilities in another area. These performance changes, capabilities, and/or problems provide new and different opportunities for further suspension improvement and/or advancements thereby fueling an ongoing state of analysis, invention, and development.

BRIEF DESCRIPTION OF THE DRAWINGS

Aspects of the present invention are illustrated by way of example, and not by way of limitation, in the accompanying drawings, wherein.

Figure 1A:
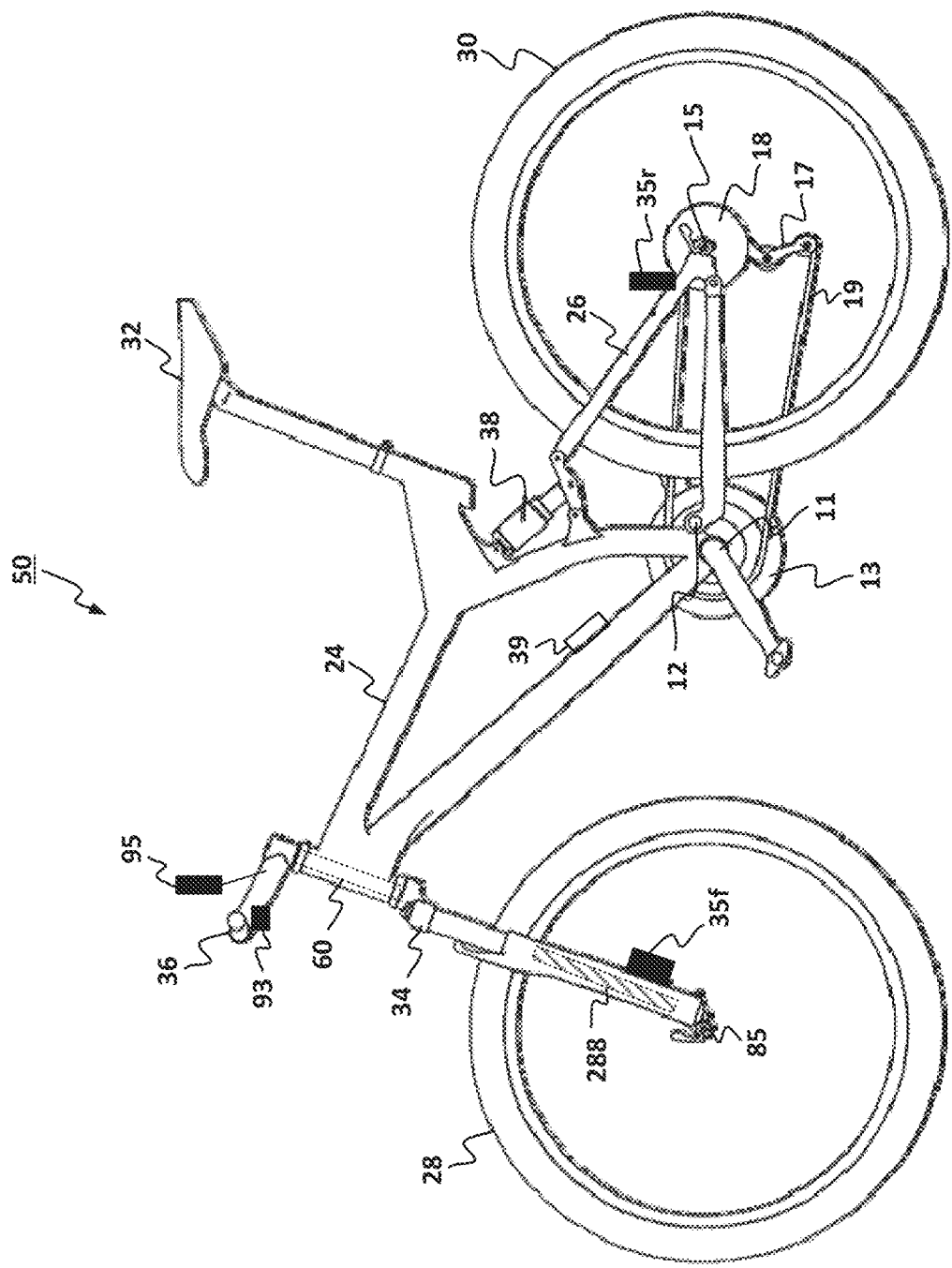
FIG. 1A is a schematic side view of a bicycle having a wireless active suspension system, in accordance with an embodiment.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, objects, and circuits have not been described in detail as not to unnecessarily obscure aspects of the present disclosure In general, a suspension system for a vehicle provides a motion modifiable connection between a portion of the vehicle that is in contact with a surface and some or all of the rest of the vehicle that is not in contact with the surface. For example, the portion of the vehicle that is in contact with the surface can include one or more wheel(s), skis, tracks, hulls, etc., while some or all of the rest of the vehicle that is not in contact with the surface include suspended portions such as anything on a frame, a seat, handlebars, engines, cranks, etc.

In its basic form, the suspension is used to increase ride comfort, performance, endurance, component longevity and the like. In general, the force of jarring events, rattles, vibrations, jostles, and the like which are encountered by the portion of the vehicle that is in contact with the surface are reduced or even removed as it transitions through the suspension before reaching suspended portions of the vehicle to include components such as seats, steering wheels/handlebars, pedals/foot pegs, fasteners, drive trains, engines, and the like.

For example, on a wheeled vehicle, a portion of the wheel (or tire) will be in contact with the surface being traversed (e.g., pavement, dirt, gravel, sand, mud, rocks, etc.) while a shock assembly and/or other suspension system components will be coupled between a wheel retaining assembly and the suspended portion of the vehicle (often a portion of the vehicle frame and associated systems, the seat, handlebars, pedals, controls, steering wheel, interior, etc.).

In a snow machine, a portion of the track and/or the skis that will be in contact with the surface being traversed (e.g., snow, ice, etc.) while a shock assembly and/or other suspension components will be coupled between a track retaining assembly (and similarly the skis retaining assembly) and the suspended portion of the vehicle (usually including the engine and associated systems, the seat, handlebars, etc.).

In a boat or PWC vehicle, a portion of the hull will be in contact with the surface of the water while a shock assembly and/or other suspension components will be coupled between the hull and the suspended portion(s) of the vehicle (such as the seat, the handlebars, a portion of the vehicle frame, and/or the like).

In an airplane in flight, it is the airframe that is in contact with the surface being traversed (e.g., the air) while a shock assembly and/or other suspension components will be coupled between the airframe and the suspended portion(s) of the vehicle (such as the seats and the like).

As vehicle utilization scenarios change, one or more shock assemblies of the suspension system can be adjusted for different characteristics based on the use type of the vehicle, terrain, purpose (e.g., rock crawl, normal use, race set-up, etc.), and the like. For example, a downhill mountain bike rider (motocross rider, off-road truck driver, side-by-side rider, snow machine racer, etc.) would want a suspension configuration with a large range of motion and aggressive rebound and compression speeds to maintain as much contact as possible between the tires and the ground by absorbing the terrain events such as bumps, ruts, roots, rocks, dips, etc. while reducing the impacts felt at the suspended portion and also have the suspension return to its SAG setting as quickly as possible in preparation for the next encounter.

In contrast, a street bike racer (track racing vehicle, boat/PWC racer, etc.) would want a firmer suspension configuration with a very small range of motion to provide feel for the grip of the tire, maintain friction and/or aerodynamic geometries, and the like, in order to obtain the maximum performance from the vehicle.

In a normal use scenario, such as a trip to the local store, a ride around town or on a path, a drive to grandma's house, a boat ride out on a lake, etc., one choice for the suspension configuration would be based on providing the most comfort.

In one embodiment, there may be times where changes to a suspension component are desired during a given ride/drive. For example, a bike rider in a sprinting scenario would often want to firm up or possibly even lockout the suspension component to remove the opportunity for rider induced pedal bob. Similarly, a ride/drive from a paved road to an off-road environment (or vice-versa) would also be a time when a change to one or more suspension component settings is valuable.

In general, pedal bob is a suspension motion caused when the rider is standing up and pedaling. As the rider reaches the bottom of the crank/pedaling circle, a dead spot is created in the pedal circle as the rider's weight momentarily comes to reset on the pedal that is at the bottom of the pedal circle and before the opposite leg can begins to pick up the rider weight on the opposite downward pedal stroke. Pedal bob wastes energy that is input into the bicycle as the suspension will absorb a portion of the energy in the form of suspension friction instead of using all of the input energy for propulsion.

With respect to the term lockout, for purposes of the following discussion, lockout refers to the most restricted flow state attainable or desirable. Thus, in one embodiment, lockout refers to a stoppage of all fluid flow through a given fluid path. However, in another embodiment, lockout does not stop all the fluid flow through a given fluid path. For example, a manufactured component may not be able to stop all fluid flow due to tolerances, or a manufacturer (designer, etc.) may not want to stop all fluid flow for reasons such as lubrication, cooling, etc. Similarly, a lockout state could be a "perceived lockout"; that is, the flow area through a flow path of the damper has been reduced to a minimum size for a given damper, machine, environment, speed, performance requirement, etc. For example, in one "perceived lockout" most, but not all, of the fluid flow is minimized while in another "perceived lockout" the fluid flow is reduced by only half (or a third, quarter, three-quarters, or the like).

In the following discussion, the term ride height refers to a distance between a portion of a vehicle and the surface across which the vehicle is traversing. Often, ride height is based on one or more of a number of different measurements such as, but not limited to, a distance between a part of the vehicle and the ground, a measurement between the top of an unsprung portion of a vehicle and a suspended portion of the vehicle there above, etc. For example, a portion of the wheel(s) (or ski, track, hull, etc.) will be in contact with the surface, while one or more shock assemblies and/or suspension components maintain the suspended portion of the vehicle a certain height there above.

In one embodiment using a wheeled vehicle example, a portion of the wheel will be in contact with the surface while a shock assembly and/or other suspension components will be coupled between a wheel retaining assembly and the suspended portion of the vehicle (often a portion of the vehicle frame). The ride height is established by the geometries of the shock assembly and/or other suspension components, the wheel retaining assembly, the wheel and tire profile, and the like.

Similarly, in a snow machine, a portion of the track (and similarly the skis) will be in contact with the surface while a shock assembly and/or other suspension components will be coupled between a track retaining assembly (and similarly the skis retaining assembly) and the suspended portion of the vehicle (often a portion of the vehicle frame). Here again, the ride height is established by the geometries of the shock assembly and/or other suspension components, the track and ski retaining assemblies, the track and/or ski profile, and the like.

In one embodiment, such as a boat or PWC vehicle, a portion of the hull will be in contact with the surface of the water while a shock assembly and/or other suspension components will be coupled between the hull and the suspended portion(s) of the vehicle (such as the seat, the handlebars, a portion of the vehicle frame, and/or the like). Here again, the ride height is established by the geometries of the shock assembly and/or other suspension components, with respect to the hull and the suspended portion(s) of the vehicle.

In the following discussion, the term initial SAG settings or "SAG" refers to a pre-defined vehicle ride height and suspension geometry based on the initial compression of one or more shock assemblies of the suspension system for a given vehicle when it is within its normal load envelope configuration (e.g., with a rider/driver and any initial load weight). Once the SAG is established for a vehicle, it will be the designated ride height of the vehicle, until and unless the SAG is changed.

The initial SAG for a vehicle is usually established by the manufacturer. The vehicle SAG can then be modified and/or adjusted by an owner, a mechanic, or the like. For example, an owner can modify the SAG to designate a new normal ride height based on a vehicle use purpose, load requirements that are different than the factory load configuration, an adjustment modification and/or replacement of one or more of the suspension components, a change in tire size, a performance adjustment, aesthetics, and the like.

For example, an unloaded motorcycle may have an initially assembled suspension ride height ranging from 30-38 inches from ground to saddle. The manufacturer will then set the manufacturer initial SAG for the vehicle based on a use category, a user weight/height range, the performance envelope, and the like.

In one embodiment, for example, the manufacturer could set the SAG for a 34-inch ride height (a middle of the performance envelope) based on a rider with a weight of 150 lbs. This would mean that unencumbered, the motorcycle would have a seat height that was higher than 34-inches of ride height (such as for example, a seat height of 38 inches). However, when a 150 lb. rider sits on the motorcycle, the suspension would compress and the motorcycle would be at the SAG ride height of 34-inches.

In one embodiment, an owner (or agent of the owner such as a mechanic, friend, shop, or the like) will modify the initial SAG to designate an owner specific SAG. For example, if the user wanted to have a lower ride height, they could adjust, modify, and/or replace one or more of the suspension components to reduce the SAG to 32-inches. In contrast, if the user wanted a higher ride height, they could adjust, modify, and/or replace one or more of the suspension components to increase the SAG to 36-inches.

In one embodiment, the owner could adjust, modify, and/or replace one or more of the suspension components to achieve the manufactures initial SAG. For example, if the rider weighed 250 lbs., when the rider sat on the motorcycle configured for a 150 lb. rider, the ride height would be lower than the 34-inch SAG. As such, the rider would adjust, modify, and/or replace, one or more of the suspension components to return the motorcycle to the 34-inch SAG.

In one embodiment, the initial manufacturer will use SAG settings resulting in a pre-established vehicle ride height based on vehicle use, size, passenger capacity, load capacity, and the like. For example, a truck (side-by-side, car, or the like) may have a pre-established SAG based on an expected load (e.g., a number of passengers, an expected cargo requirement, etc.).

Regardless of the vehicle type, once the SAG is established, in a static situation the ride height of the expectedly loaded vehicle should be at or about the established SAG. When in motion, the ride height will change as the vehicle travels over the surface, and while the suspension system is used to reduce the transference of any input forces received from the surface to the rest of the vehicle it is also used to maintain the vehicle's SAG.

However, when additional weight is added to the vehicle, the suspension and one or more shock assemblies will be compressed, and the vehicle ride height will be less than the SAG.

For example, if a vehicle such as a snow machine, PWC, boat, motorcycle, or bicycle is loaded with an additional 100 lbs. of cargo in the rear, the extra 100-pound load will cause shock assembly compression (and the like) thereby causing the vehicle to ride lower in the rear (or to ride in a bow up orientation). In general, skewed rear-low ride height will move the vehicle out of SAG and change the vehicle geometry, e.g., cause a slant upward from rear to front. Often, an out of SAG condition is visually identifiable and in this particular example can result in lightness in steering, rear suspension bottom out, forward visual obstruction, and the like.

In one embodiment, for example in a side-by side that is loaded with 250 lbs. of additional weight, the additional weight will reduce the available operating length of one or more suspension components which can be detrimental to steering and performance characteristics, could cause an unwanted impact between wheel (or wheel suspension) and frame, increase the roughness of the ride, increase suspension stiffness, result in suspension bottom out, loss of control, tire blow out, and the like.

In one embodiment, for example in a truck that is loaded with 500 lbs. of additional weight, when the weight is added to the vehicle, if it is not centered, it will not only cause a change in the front or rear SAG (depending upon the load location fore or aft), but will also cause SAG changes that will differ between the left and right side of the vehicle. For example, if the load is in the rear and off-center to the left, the load-modified ride-height of the vehicle will be lopsided. That is, not only will the rear of the vehicle be lower than the front, but the left-side suspension will also be compressed more than the right-side suspension causing the rear left of the vehicle to have a lower ride-height than the other three corners.

Thus, while the entire rear of the vehicle will be out of SAG and therefore riding lower than the front of the vehicle, it will also be lopsided between the left and right sides. Such lopsided suspension characteristics can be extremely deleterious while driving and will often result in a number of deleterious issues including, but not limited to: steering problems, suspension bottom out, loss of control, tire blowout, and vehicle rollover.

In contrast to the examples above, when the weight on the vehicle (e.g., rider, passengers, cargo, etc.) is less than the expectedly loaded vehicle weight, the suspension and one or more shock assemblies will be less compressed, and the vehicle ride height will be higher than the SAG. This lighter loaded situation can also result in a number of deleterious issues including, but not limited to: improper seat height (e.g., a rider will be higher off the ground than expected), change in vehicle height clearance, suspension top-out, suspension issues caused by the vehicle operating outside of the operating envelope for the suspension, and the like.

Additional information regarding SAG and SAG setup can be found in U.S. Pat. No. 8,838,335 which is incorporated by reference herein, in its entirety.

In the following discussion, and for purposes of clarity, a bicycle is utilized as the example vehicle. However, in another embodiment, the vehicle could be on any one of a variety of vehicles such as, but not limited to, a bicycle, a motorized bicycle, a motorcycle, a watercraft (e.g., boat, jet ski, PWC, etc.), a snow machine, a single wheeled vehicle, a multi-wheeled vehicle, a side-by-side, an on- and/or off-road vehicle, or the like. In general, a motorized bike can include a bike with a combustion motor, an electric bike (e-bike), a hybrid electric and combustion bike, a hybrid motor and pedal powered bike, and the like.

Embodiments described herein provide a new and different system and method for using a wireless active suspension system. One embodiment uses a sensor, or group of sensors, (e.g., an accelerometer, or the like, often referred to as a bump sensor) attached to an unsprung location in the front and/or rear of the vehicle that senses an event (e.g., a bump) encountered by the bike—essentially reading the terrain. In one embodiment, the event is determined by a different sensor type as described herein, and in one embodiment, the sensor is a forward-looking sensor that detects an upcoming event before the event is actually encountered by the vehicle. In general, the goal is to discern if the bike is experiencing bumpy or smooth terrain and to modify a suspension characteristic accordingly. For example, on smooth terrain, the suspension is in a firm mode, while in bumpy terrain the suspension is in a softer mode.

When a large event, like a pothole on a road, or a rock or tree root on a trail is encountered by a vehicle, there is a large spike in acceleration which is reported by the sensor to the controller which then triggers an active valve in the suspension to switch the suspension to a softer (or even a softest)

setting. For example, if the front wheel of a road bike hits a pothole, the large spike in acceleration is reported by the front sensor to the controller which triggers an active valve in the suspension to switch the suspension to a softer (or even a softest) setting. It is the goal of the present invention to sense the event and switch the suspension to the softer (or even the softest) setting, such that the event is absorbed by the softer setting of the damper before it can reach the rider. In general, the shortest path is from front wheel to handlebars. Thus, the event needs to be recognized and reacted to within a time period of approximately 15 milliseconds, which is the approximate amount of time before the event is "felt" by the rider at the handlebars.

However, embodiments described herein do not just provide an active suspension system that is able to react to the event within the "felt" time period. Embodiments provide a wireless active suspension system that are able to react to the event within the "felt" time period that reduce installation complexity, remove the need for frame modifications that are required with wired components, remove the vulnerability of a wire being damaged in a crash, being snagged by a tree branch, and the like.

Referring now to FIG. 1A, a schematic side view of a bicycle 50 having a wireless active suspension system is shown in accordance with an embodiment. Bicycle 50 has a main frame 24 with a suspension system comprising a swing arm 26 that, in use, is able to move relative to the rest of main frame 24; this movement is permitted by, inter alia, active valve damper 38. The front fork 34 also provide a suspension function via a damping assembly in at least one fork leg; as such the bicycle 50 is a full suspension bicycle (such as an ATB or mountain bike).

However, the embodiments described herein are not limited to use on full suspension bicycles. In particular, the term "suspension system" is intended to include vehicles having front suspension only, rear suspension only, seat suspension only, a combination of two or more different suspensions, and the like. In one embodiment, swing arm 26 is pivotally attached to the main frame 24 at pivot point 12 which is located above the bottom bracket axis 11. Although pivot point 12 is shown in a specific location, it should be appreciated that pivot point 12 can be found at different distances from bottom bracket axis 11 depending upon the rear suspension configuration. The use of the specific pivot point 12 herein is provided merely for purposes of clarity. Bottom bracket axis 11 is the center of the pedal and front sprocket assembly 13. Bicycle 50 includes a front wheel 28 which is coupled to the main frame 24 via front fork 34 and a rear wheel 30 which is coupled to the main frame 24 via swing arm 26. A seat 32 is connected to the main frame 24 in order to support a rider of the bicycle 50.

Figure 2A:
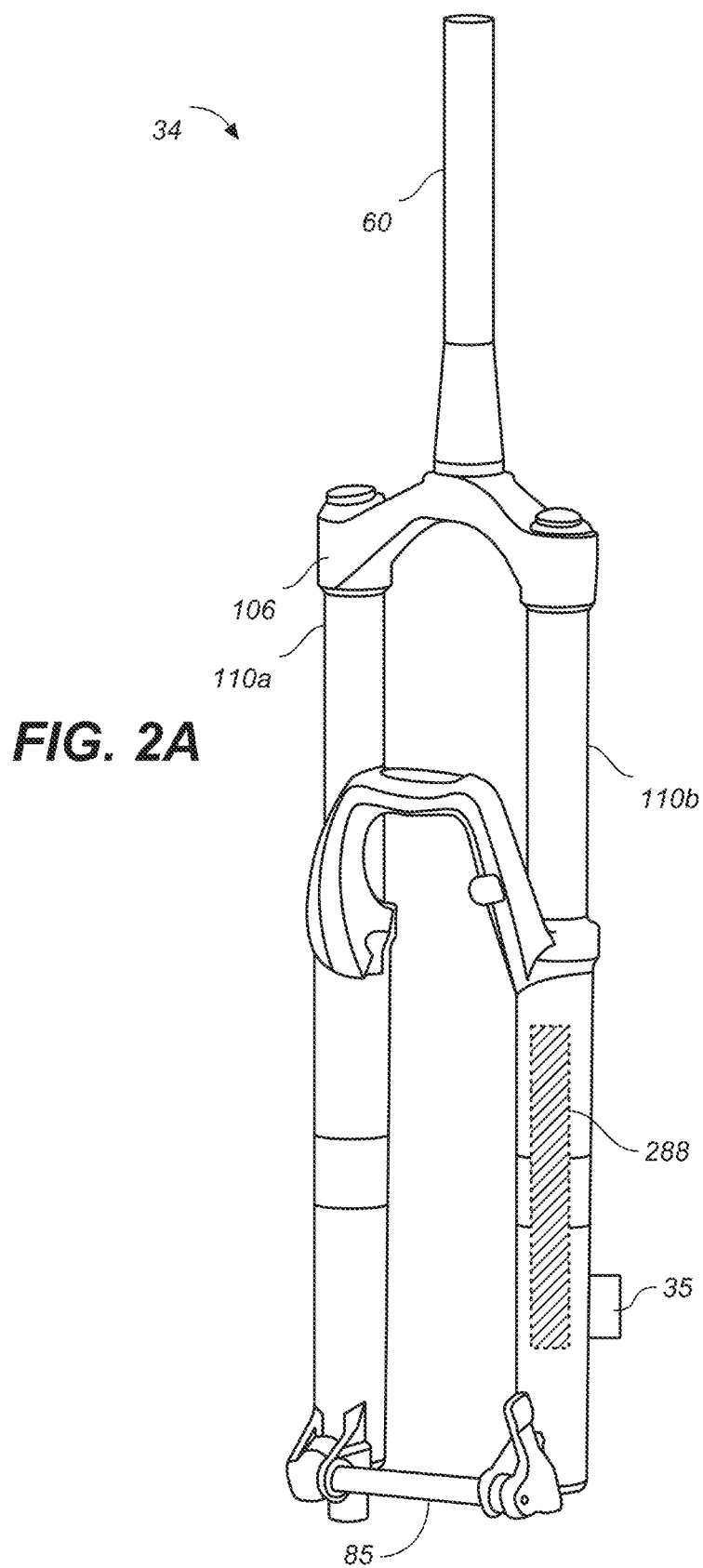
FIG. 2A is a perspective view of a fork including a portion of the wireless active suspension system and its components, in accordance with an embodiment.
Figure 2B:
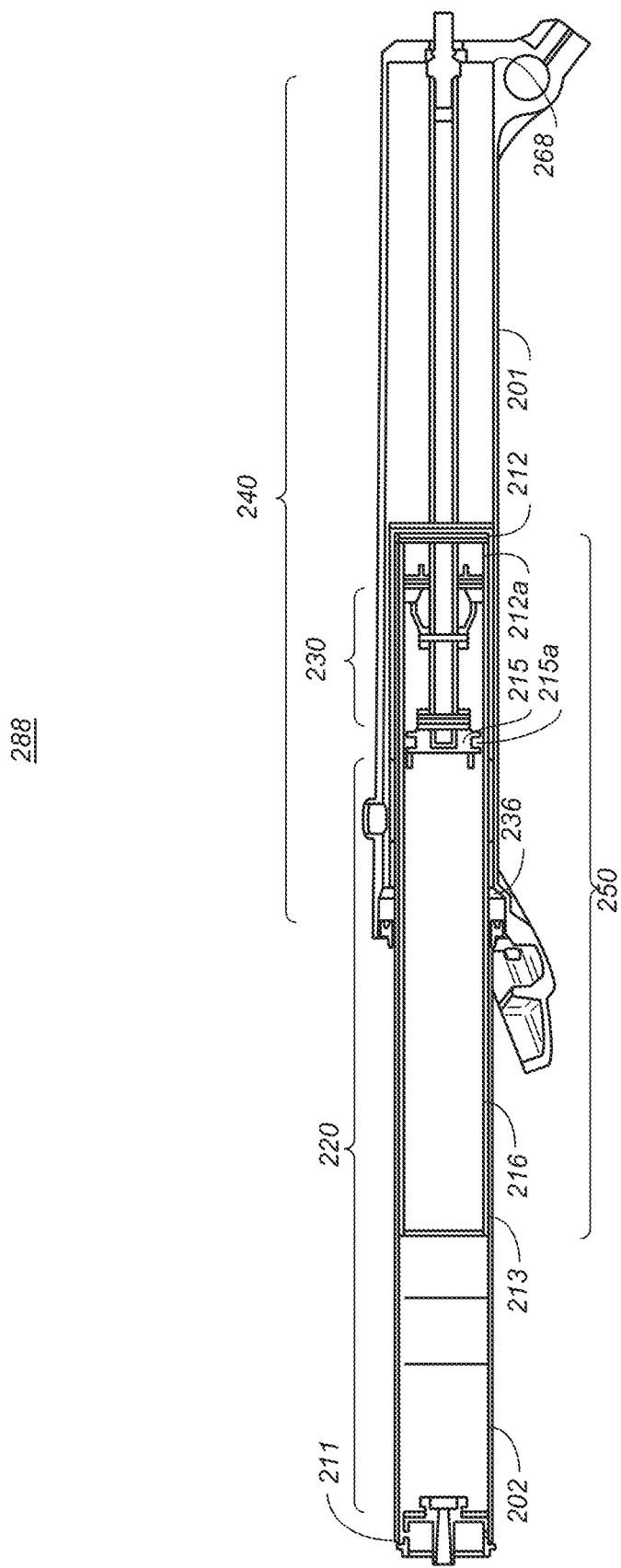
FIG. 2B is a cross-sectional view of an exemplary front fork damper assembly, in accordance with an embodiment.

The front wheel 28 is coupled with front fork 34 via axle 85. The front fork 34 includes a crown 100, fork leg 110a, and fork leg 110b as shown in FIG. 2A. Above the crown 100, a steerer tube 60 attaches the fork 34 to the bicycle main frame 24 and the handlebars 36 (via a stem) allowing the rider to steer the bicycle 50. In one embodiment, at least one active valve damper 288 is integrated with fork 34. The active valve damper 288 is shown in FIG. 2B and is described in more detail in the discussion of FIG. 2B.

The rear wheel 30 is connected to the swing arm 26 of the frame 22 at rear axle 15. A rear damping assembly (e.g., active valve damper 38) is positioned between the swing arm 26 and the frame 22 to provide resistance to the pivoting motion of the swing arm 26 about pivot point 12. Thus, the illustrated bicycle 50 includes a suspension member between swing arm 26 and the main frame 24 which operate to substantially reduce rear wheel 30 impact forces from being transmitted to the rider of the bicycle 50.

In other words, the active suspension components are coupled with the wheels, seats, handlebars, or the like, and are used to reduce an initial force generated by an event (e.g., imparted to a wheel of the vehicle from the surface on (or through) which the vehicle is traveling) to a lesser force as it is transferred to the rest of the vehicle and/or persons riding therein/thereon.

Bicycle 50 is driven by a chain 19 that is coupled with both front sprocket assembly 13 and rear sprocket 18. As the rider pedals the front sprocket assembly 13 is rotated about bottom bracket axis 11 a force is applied to chain 19 which transfers the energy to rear sprocket 18. Chain tension device 17 provides a variable amount of tension on chain 19. The need for chain 19 length variation can be due to a number of different gears that may be on one or both of front sprocket assembly 13 and/or rear sprocket 18 and/or changes in chain stay length as the distance between bottom bracket axis 11 (where front sprocket assembly 13 attaches to main frame 24) and the rear axle 15 changes due to suspension articulation.

Figure 1B:
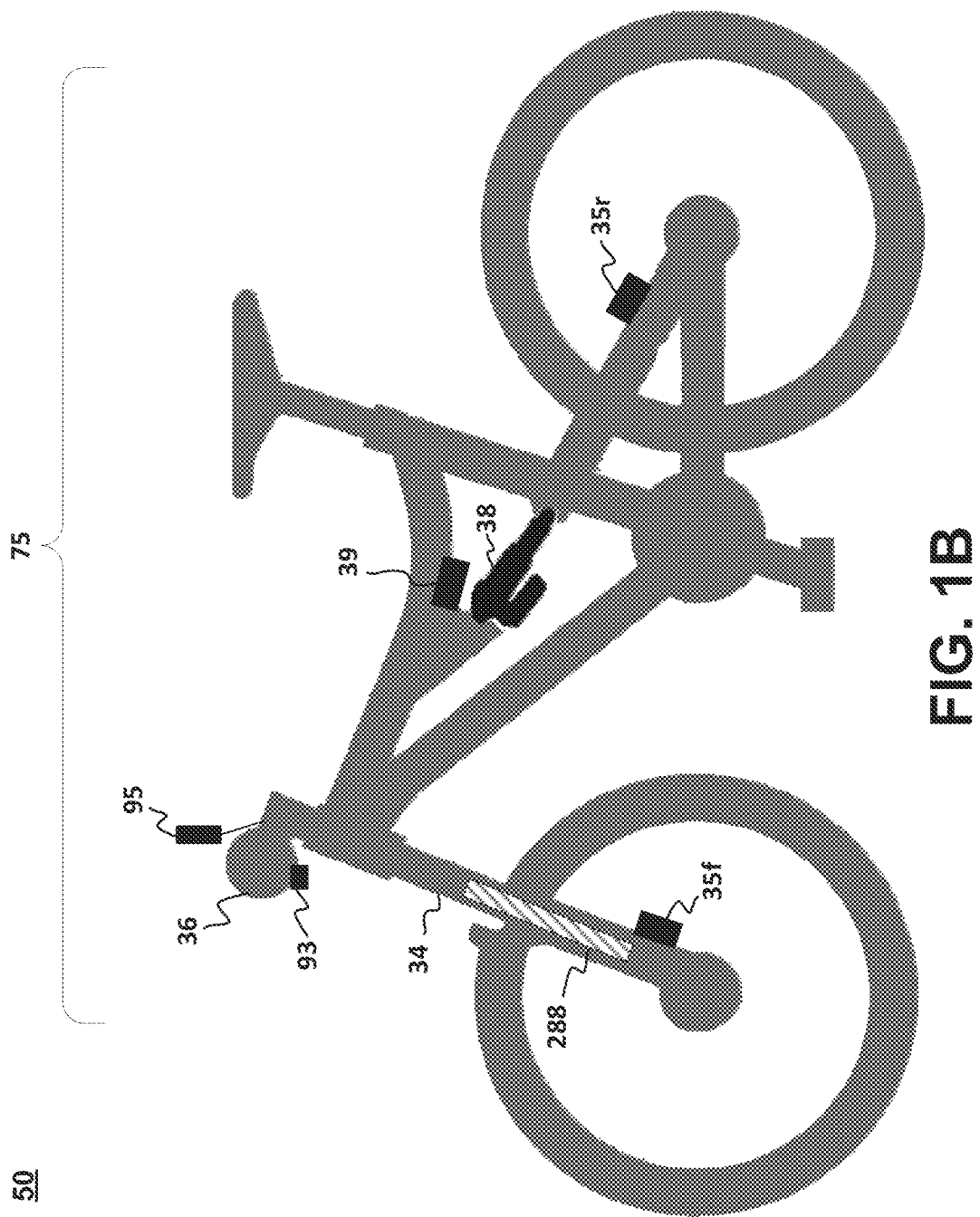
FIG. 1B is a schematic side view of a bicycle with focus on the wireless active suspension system and its components, in accordance with an embodiment.

In one embodiment, bicycle 50 includes a wireless active suspension system consisting of a controller 39, one or more sensors (e.g., sensor 35f, 35r, mobile device 95, and the like), smart components, active valve dampers (e.g., active damper 38, active damper 288, a seat post damper, etc.), or the like. In one embodiment, sensor 35r is positioned on the swing arm 26 the rear axle 15 of bicycle 50. In one embodiment, sensor 35f is positioned in an unsprung location of front fork 34. In yet another embodiment, both sensor 35r and sensor 35f are on bicycle 50. Further discussion of the wireless active suspension system is shown in FIGS. 1B and 1s provided in the discussion of FIG. 1B herein.

Although mobile device 95 is shown mounted to handlebar assembly 36, it should be appreciated that the mobile device 95 could be in a rider's backpack, pocket, or the like and still provide the sense input information. In general, mobile device 95 is a smart device such as a mobile phone, a smart phone, a tablet, a smart watch, a piece of smart jewelry, smart glasses, or other user portable device(s) having wireless connectivity. Mobile device 95 is capable of broadcasting and receiving via at least one network, such as, but not limited to, WiFi, Cellular, Bluetooth, NFC, and the like. In one embodiment, mobile device 95 includes one or more of a display, a processor, a memory, a GPS, a camera, and the like.

Mobile device 95 can include one or more sensors such as audio, visual, motion, acceleration, altitude, GPS, and the like. In one embodiment, mobile device 95 includes an optional application that operates thereon.

In one embodiment, switch 93 is a positional switch used in conjunction with the wireless active suspension system. In one embodiment, switch 93 is a multi-positional switch, an upshift/downshift type of switch, a button type switch, or the like. For example, switch 93 would be a 2-position switch, a 3-position switch, a switch that can cycle through a number of different modes (similar to a gear shift), or the like.

In one embodiment, switch 93 is wireless and communicates with one or more of the other components of wireless active suspension system via a wireless personal area network (WPAN), a low power network (LPAN), Internet of things (IoT) connectivity, or the like. In one embodiment, communication protocol could be, but is not limited to, Bluetooth, WiFi, Bluetooth Low Energy (BLE), near field communication (NFC), UHF radio signal, Worldwide Interoperability for Microwave Access (WiMax), long-term evolution (LTE), industrial, scientific, and medical (ISM) band, IEEE 802.15.4 standard communicators, Zigbee, ANT, ISA100.11a (wireless systems for industrial automation: process control and related applications) wireless highway addressable remote transducer protocol (HART), MiWi, IPv6 over low-power wireless personal area networks (6LoWPAN), thread network protocol, subnetwork access protocol (SNAP), and the like.

Although switch 93 is shown mounted to handlebar assembly 36, it should be appreciated that switch 93 could be mounted in a different location on the vehicle, on a mount coupled to the vehicle, or the like. In one embodiment, the location of switch 93 is modifiable and is located on the vehicle based on a rider's preference.

Some or all of components of embodiments herein including sensors, switches, controllers, valves, and the like may be interconnected or connected wirelessly via a network such as WPAN, an LPAN, IoT connectivity, or the like. In one embodiment, the transmission protocol could be, but is not limited to, Bluetooth, WiFi, BLE, NFC, UHF radio signal, WiMax, LTE, ISM band, an IEEE 802.15.4 standard communicator, Zigbee, ANT, ISA100.11a, wireless HART protocol, MiWi, IPv6, 6LoWPAN, thread network protocol, SNAP, and the like.

Referring now to FIG. 1B, a schematic side view of a bicycle 50 with focus on the wireless active suspension system 75 is shown in accordance with an embodiment.

In one embodiment, wireless active suspension system 75 includes controller 39, one or more sensors (e.g., sensor 35f, 35r, mobile device 95, and the like), hereinafter "sensor 35", smart components, active valve dampers (e.g., active damper 38, active damper 288, a seat post damper, etc.), or the like.

In the following discussion, sensor 35 could be a single sensor (such as an accelerometer) or a combination of sensor types. In general, sensor 35 is used for sensing characteristics (or changes to characteristics) such as terrain, environment, temperature, vehicle speed, vehicle pitch, vehicle roll, vehicle yaw, component activity, or the like. It is understood that the one or more sensors may be imbedded, moved, mounted, or the like, in any suitable configuration and allowing for any suitable range of adjustment as may be desirable.

For example, the sensor 35 may be any suitable force or acceleration transducer (e.g., strain gage, Wheatstone bridge, accelerometer, hydraulic, interferometer based, optical, thermal or any suitable combination thereof). Further, the sensor may utilize solid state electronics, electro-mechanical principles or MEMS, or any other suitable mechanisms.

In one embodiment, sensor 35 is a single axis accelerometer, a triaxial accelerometer, a measurement type sensor such as an infrared based time of flight sensor, a radar, 2D and 3D imager, ultrasonic sensor, photoelectric sensor, LiDar, and the like. In one embodiment, the measurement type sensor is a STMicroelectronics sensor and specifically STMicroelectronics sensor model VL53L0X.

In general, a measurement sensor is used to measure distances by projecting a laser light (or sound, etc.) and measuring the reflection. Differences in return times and wavelengths are used to provide distance measurement information. For example, the time-of-flight sensor mounted on the vehicle is used to measure the distance to the ground in front of the vehicle. In so doing, the time-of-flight sensor will provide distance data that is used to monitor and detect terrain changes.

In one embodiment, the measurement type sensor continuously and/or repeatedly measures a distance from the sensor to the ground. By monitoring the distance from the sensor to the ground, the measurement type sensor can determine the existence of an upcoming obstacle (e.g., height changes due to holes, bumps, or other obstacles), a shape or abruptness of the obstacle, etc.

For example, in one embodiment, the sensor could be aimed at a point that is approximately 2 feet in front of the bike. In general, by repeatedly measuring the distance from the sensor to the ground in front of the vehicle, any changes in that distance are indicative of an upcoming obstacle.

Although a distance of 2 feet is used in one embodiment, in another embodiment, the distance to the point in front of the bike varies depending upon speed, terrain, and the like. For example, in one embodiment, the distance in front of the bike is defined by user option, factory guidance provided by the damper manufacturer, sensor manufacturer, bike manufacturer, damping system controller manufacturer, or the like.

In operation on a steady surface, the sensor will regularly obtain a time-of-flight of x (plus or minus some nominal value depending upon the type of surface, type of vehicle, the precision/tolerance of the sensor, user or system defined tolerance, or the like). For example, in one embodiment, if a bike with a very tight suspension setup (such as a road bike), is being ridden on a paved road, the nominal value would be slight (e.g., less than a ¼") such that a change in measurement (e.g., a ½" deep pothole) would be larger than the nominal value. In contrast, in one embodiment, if a bike with a suspension setup that is not as tight as the road bike (such as a gravel bike) is being ridden on the road, the nominal value could be larger (e.g., less than 1") such that the change in measurement (e.g., a ½" deep pothole) would not be larger than the nominal value. Furthermore, in one embodiment, if a bike with a longer suspension setup (such as a mountain bike) is being ridden on the road, the nominal value could be even larger (e.g., less than 3") such that the change in measurement (e.g., a 2" deep pothole) would not be larger than the nominal value.

When the sensor obtains a time-of-flight of x+n (where n is a value that is larger than the nominal value) it would mean that a depression (or hole) is detected. Moreover, the size of n would provide information about the depth of the depression, the size of the depression, the geometry (e.g., angle or grade) of the depression, etc.

In contrast, when the sensor obtains a time of flight of x−n, a bump (or rise) is detected. Here, the size of n would provide information about the height of the rise, the size of the rise, the geometry of the rise, etc.

In one embodiment, the n value is preset for the type of active suspension, the terrain type, the vehicle type, the ride type, or the like.

In one embodiment, the sensors of wireless active suspension system 75 provide the obtained sensor data to a suspension controller 39 which uses the sensor data to make suspension adjustments. In one embodiment, suspension controller 39 makes suspension adjustments to active valve damper 38, active valve damper 288, or the like.

In one embodiment, location data from a position system is used in conjunction with terrain data to determine probability of obstacles is used to provide a priori knowledge to optimize suspension configuration. For example, GPS location information and a terrain database (or the like) is used to establish the bike's current location and the terrain about the location (e.g., on a bumpy patch of trail, etc.).

In one embodiment, suspension controller 39 monitors the sensor(s) 35 for sensor input (and/or the location and terrain data, etc.) and make suspension adjustments in a matter of milliseconds after receiving the sensor data. For example, in one embodiment, sensors on the fork, rear axle, and/or main frame read bump input at the wheel and send the obtained sensor data to the suspension controller 39. Thus, by placing sensors on the frame and/or in unsprung location for both wheels, the suspension controller 39 processes data from the terrain to constantly adjust the suspension for maximum efficiency and control. In one embodiment, suspension controller 39 includes a power source such as a lithium-ion battery or the like. In one embodiment, the power source for suspension controller 39 is charged wired or wirelessly while either on or off the bicycle.

In general, the one or more sensors may be attached to the swing arm 26 directly, to any link thereof, to an intermediate mounting member, to front fork 34, to active valve damper 38, seat 32, handlebar assembly 36, or to any other portion or portions of the bicycle 50 as may be useful, available, or the like. In one embodiment, one or more sensors and valve actuators (e.g. electric solenoid or linear motor type—note that a rotary motor may also be used with a rotary actuated valve), suspension components, suspension component controller(s) and/or data processing system(s), and the like may be coupled to and/or integrated with the vehicle structure, such as disclosed in U.S. Pat. Nos. 7,484,603; 8,838,335; 8,955,653; 9,303,712; 10,036,443; 10,060,499; 10,443,671; and 10,737,546; the content of which is incorporated by reference herein, in its entirety. Further, sensors and valves, or principles, of patents and other documents incorporated herein by reference, may be integrated one or more embodiments hereof, individually or in combination.

Although a number of sensors are shown in FIG. 1B, it should be appreciated that there may be only a single sensor or two or more sensors in operation. Moreover, in one embodiment, mobile device 95 is part of the wireless active suspension system 75.

In one embodiment, suspension controller 39 will use the sensor data to generate suspension adjustments for damping assemblies via one or more of the active valves (e.g., active valve 450). For example, the active valve 450 in the damper assembly 288 (or the active valve 450 in the damper assembly 38) will receive a signal from suspension controller 39 to adjust one or more flow paths to modify the damping characteristics of the damper. Additional information for vehicle suspension systems, sensors, and their components as well as adjustment, modification, and/or replacement aspects including manually, semi-actively, and/or actively controlled aspects and wired or wireless control thereof is provided in U.S. Pat. Nos. 8,838,335; 9,353,818; 9,682,604; 9,797,467; 10,036,443; 10,415,662; the content of which are incorporated by reference herein, in their entirety.

In one embodiment, suspension controller 39 can also communicate wired or wirelessly with other devices such as another controller, a mobile device, a computing system, and/or any other smart component(s) within a transmission range of suspension controller 39. For example, in one embodiment, suspension controller 39 can communicate with other controllers 39, mobile devices 93, and other computing devices wired or wirelessly via systems such as near field communication (NFC), WAN, LAN, Bluetooth, WiFi, ANT, GARMIN® low power usage protocol, or any suitable power or signal transmitting mechanism.

In one embodiment, suspension controller 39 connectivity allows suspension controller 39 to communicate with other controllers. In one embodiment, the communication could be with a controller on a second vehicle, or any number of controllers on any number of vehicles within range of controller 39.

For example, if two riders are riding two bikes within a communication range of the suspension controllers, one or more suspension controllers on each of the bicycles could be communicating wirelessly such that the suspension information from the lead bike is also provided to the follow bicycle(s) (or automobiles, motorcycles, ATVs, snowmobiles, water vehicles, and the like). In so doing, the suspension information from the lead vehicle can be used as future suspension information to the follow vehicle(s). In other words, the front vehicle information is provided to the follow vehicle(s) a short time prior to the follow vehicle(s) actually reaching the location of the suspension event (or terrain, etc.) that the front vehicle has already encountered. This would allow a suspension controller 39 on a follow vehicle to use the active valve adjustment to prepare the damper for the upcoming terrain or event.

In one embodiment, suspension controller 39 is in wireless communication with wireless sensor 35*f*, wireless sensor 35*r*, and/or other sensors. In one embodiment, communication is transmitted via a network such as WPAN, are LPAN. IoT connectivity, or the like. In one embodiment, the wireless transmission protocol could be, but is not limited to, Bluetooth, WiFi, BLE, NFC, UHF radio signal. WiMax, LTE, ISM band, an IEEE 802.15.4 standard communicator, Zigbee, ANT, ISA100.11a, wireless HART protocol, MiWi, IPv6, 6LoWPAN, thread network protocol, SNAP, and the like.

Figure 3A:
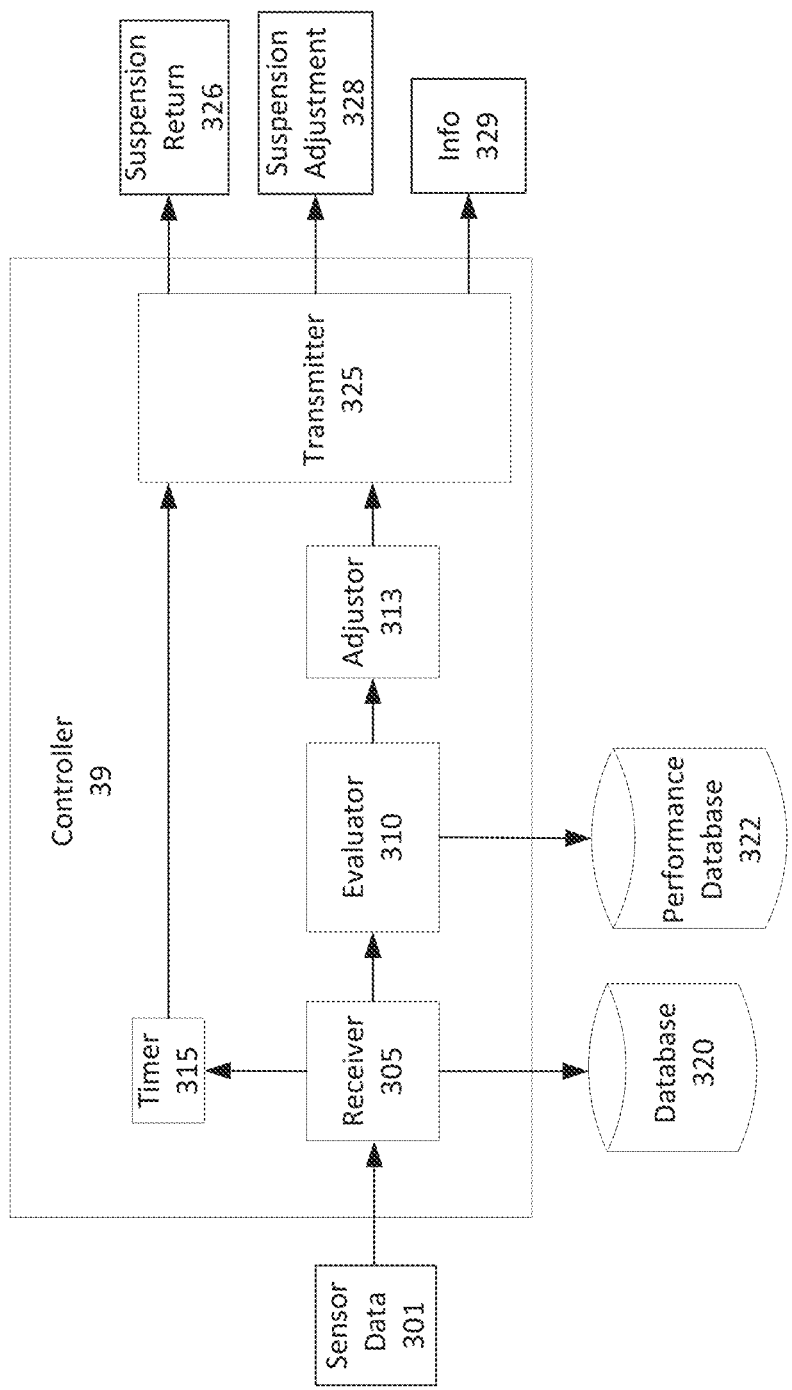
FIG. 3A is a block diagram of a controller, shown in accordance with an embodiment.
Figure 3B:
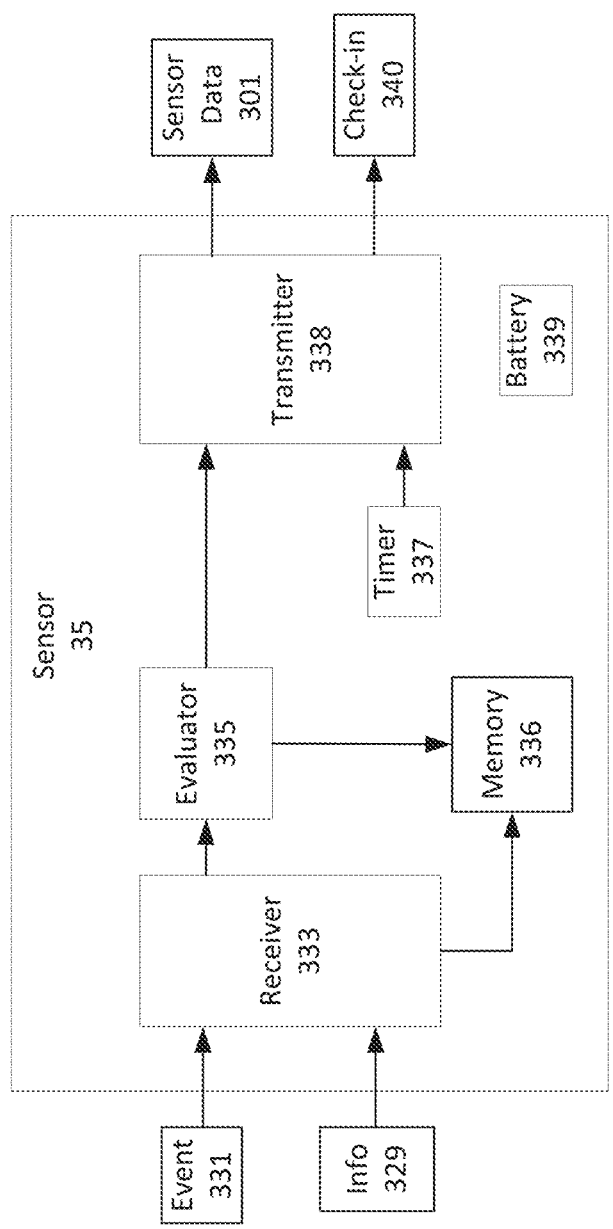
FIG. 3B is a block diagram of a sensor, shown in accordance with an embodiment.

Further discussion of the controller 39 is shown in FIG. 3A and described in the discussion of FIG. 3A. Further discussion of the wireless sensor 35 is shown in FIG. 3B and described in the discussion of FIG. 3B.

In one embodiment, wireless switch 93 is mounted inboard of the hand grip on handlebar 36. In one embodiment, wireless switch 93 is mounted to frame 24 or any location on the vehicle based on a rider preference. In one embodiment, wireless switch 93 has a number of switch positions.

For example, in one embodiment, wireless switch 93 has three positions allowing the selection of three different modes. The modes could be open, auto, and lock out (different levels of bump sensing, or some combination thereof). The lock out mode would be a "sprint" type setting that would lock-out the suspension, providing no bump sensing and removing the opportunity for pedal bob.

In an open mode embodiment, the suspension would be a softer suspension that does not use any (or uses only limited bump sensing for the most major of suspension events). In the auto mode, the suspension controller 39 would operate in the "best" configuration. Such a "best" configuration could be based on terrain, rider, riding style, bike type, ride length, ride purpose, etc. For example, a "best" mode for a downhill mountain bike race would be a very active suspension configuration with a large range of motion, a "best" mode for a street race would be a firm suspension configuration with a very small range of motion, a "best" mode for a Sunday afternoon street ride would be a soft suspension configuration, etc.

Although three switch positions are discussed, wireless switch 93 could be a simple on/off switch to either send an activate or deactivate signal to suspension controller 39. In another embodiment, wireless switch 93 could have any different number of switches, options, menus, and the like. In one embodiment, wireless switch 93 can essentially have 1, 2, 3 or more configurable and/or pre-configured functions that can involve any number of physical/haptic/sensor interfaces. As such, in one embodiment wireless switch 93 doesn't necessarily have buttons on it, or may have buttons and other interfaces thereon. In one embodiment, wireless switch 93 could be doing other things, communicating to a bike area network (BAN), and interact with the user/rider in any number of ways such as via touch, sound, vision, radio, wearable, and the like.

In one embodiment, wireless switch 93 (and/or any of the other peripherals in the wireless mesh) includes an auxiliary or propriety private network between one or more peers. Thus, one peripherals is a gateway to an out-of-BAN wireless device that doesn't want to share its network. In this case, the out-of-BAN wireless device can provide a hardware interface and it can be piped into the BAN. Thus, in one embodiment, the wireless mesh network can be used to connect and/or control almost any wireless aspect, as the network, topology, and features thereof are well suited to interacting with basic device operating structures.

In one embodiment, one or a plurality of component(s) of the bicycle 50 are also smart component(s). Examples of the smart component(s) can include one or more of the forks, wheels, rear shocks, handlebars, front shocks, seat posts, pedals, cranks, and the like. In one embodiment, the smart component(s) will include connective features that allow them to communicate wired or wirelessly with suspension controller 39, mobile device 95, one or more sensors, and/or any other smart component(s) within transmission range (thereby becoming connected components). In one embodiment, the sensors, smart components, smart devices, controllers, valves, and the like may be interconnected or connected by (one or a combination of) wire, or wirelessly via systems such as WPAN, an LPAN, IoT connectivity, or the like. In one embodiment, the transmission protocol could be, but is not limited to, Bluetooth, WiFi, BLE, NFC, UHF radio signal, WiMax, LTE, ISM band, an IEEE 802.15.4 standard communicator, Zigbee, ANT, ISA100.11a, wireless HART protocol, MiWi, IPv6, 6LoWPAN, thread network protocol, SNAP, and the like, or any suitable power or signal transmitting mechanism, making them connected components.

By using a connected component, data (including real-time data) can be collected from the smart component by suspension controller 39. Depending upon the connected component, data such as telemetry attributes to provide angle, orientation, velocity, acceleration, RPM, operating temperature, and the like, can be obtained.

For example, a smart wheel would be a connected component that is attached to the wheel (or wheels) to provide telemetry such as RPM, tire pressure, tire temperature, or the like to suspension controller 39. For example, the smart component could be a smart valve stem, a MEMS device, or the like coupled with the rim of the wheel.

An example of a smart handlebar would be a connected component that provides handlebar geometry information, handlebar dimensions, stress measurements, or the like. For example, the smart component could be a MEMS device coupled with the handlebar.

An example of a smart seat post would be connected component that provides geometry information such as seat height, seat pitch, roll, yaw, seat forward or aft location, weight on the seat, or the like. For example, the smart component could be a MEMS device coupled with the seat post.

An example of a smart pedal would be connected component that provides telemetry such as RPM's, push and pull pressure, left side versus right side performance data (e.g., a stronger force on the right pedal or left pedal, in the up or down direction), or the like. For example, the smart component could be a MEMS device or other sensor type coupled with the pedal(s).

An example of a smart crank set would be connected component that provides telemetry such as RPM's, chain tension, chain temperature, internal crank temperature, bearing operation, or the like. For example, the smart component could be a MEMS device coupled with the crank set.

Referring now to FIG. 2A, a perspective view of a fork 34 that includes the active valve assembly 288 is shown in accordance with an embodiment. In one embodiment, fork 34 includes a crown 100, fork leg 110*a*, and fork leg 110*b*, and an axle 85. Above the crown 100, a steerer tube 60 attaches the fork 34 to the bicycle main frame 24 and the handlebars 36 (via a stem) allowing the rider to steer the bicycle 50. The steerer tube 60 interfaces with main frame 24 via bearings called a headset mounted in the head tube.

In one embodiment, axle 185 passes through the center of front wheel 28 and, as such, defines the point about which front wheel 28 rotates. In a duel legged fork setup, axle 85 is removably coupled to fork leg 110*a* and fork leg 110*b*, thereby coupling the front wheel to the fork 34. In a single legged fork setup, axle 85 is removably coupled to the single fork leg, thereby coupling the front wheel to the fork 34.

Although FIG. 2A shows fork 34 with two forks 110*a* and 110*b*, in one embodiment, there may only be a single fork. In one embodiment, the components of fork 34 are fixedly coupled during the assembly process. In one embodiment, one, some, or all of the components of fork 34 could be metal, composite, 3D printed, or the like.

Referring now to FIG. 2B, a cross-sectional view of an example of a damper assembly 288 is shown in accordance with an embodiment. In one embodiment, damper assembly 288 includes a top cap 211, a lower fork tube 201, an upper fork tube 202, a partial cartridge tube 216, a partial cartridge tube gas seal 213, a moveable piston 215 with a piston gas seal 215*a*, a base 212 with a base gas seal 212*a*, a positive damper volume 220, a negative damper volume 230, a lower leg gas volume 240, and an annular gas volume 250. In one embodiment, one or more of the valves in damper assembly 288 are active valves such as active valve 450.

Although a number of features are shown in damper assembly 288, it should be appreciated that a damper assembly with more, fewer, or different components can also be utilized. Further, other damping assemblies could be used as a damper in one or more legs of fork 34. In one embodiment, the positive damper volume 220 is at the top of the damper and includes the area from the top cap 211 (or to the top of partial cartridge tube 216) and within partial cartridge tube 216 to gas seal 215*a* on movable piston 215. The negative damper volume 230 includes the space below gas seal 215*a* on movable piston 215 down toward gas seal 212*a* on the base 212 within partial cartridge tube 216. The lower leg gas volume 240 is defined as the space from the gas seal 236 to atmosphere at the top of lower fork tube 201, about the exterior of upper fork tube 202, to the bottom 268 of the damper assembly 288.

In one embodiment, the positive damper is the volume that is compressed as the moveable piston 215 is driven upward during a compression of the fork. Thus, as the fork compresses—the positive damper volume 220 compresses. The negative damper volume 230 is the volume that is expanded as the moveable piston 215 is driven upward during a compression of the fork. Thus, as the fork compresses—the negative damper volume 230 expands. In one embodiment, the positive damper volume 220 and the negative damper volume 230 communicate at one or more position(s)/stroke(s) through an internal bypass channel.

In one embodiment, partial cartridge tube 216 can be an integral part of the fork or it can be a removably coupleable part that is axially added to the internals of the upper fork tube (such as fork tube 110a or 110b of FIG. 2A). For example, the damper could have a main piston seal on the inner diameter of fork tube 110b. In another embodiment, a cartridge damper is used. In general, a cartridge damper is completely separable from the fork tube. In other words, it can be removed from the fork tube and it would still be a damper. In general, the cartridge damper is coaxial and is a cartridge that threads into the fork tube of the suspension fork.

In one embodiment, damper assembly 288 is filled with air. However, in another embodiment, a fork damper could be filled with many different types of fluid, instead of air. The fluid could be one of an assortment of gasses (such as regular air, nitrogen, helium, carbon dioxide, and the like.) Similarly, the fluid could be a liquid.

Figure 2C:
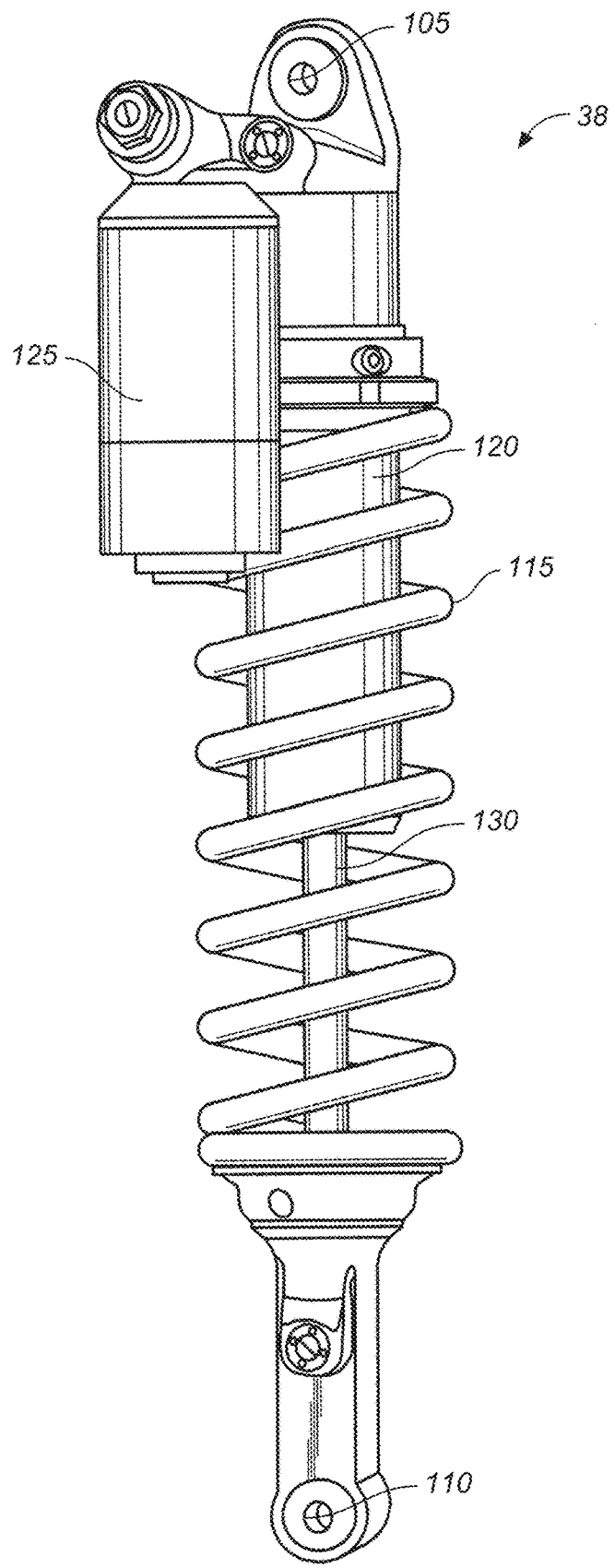
FIG. 2C is a perspective view of an exemplary rear damping assembly, in accordance with an embodiment.

FIG. 2C is a perspective view of an active valve damper 38 in accordance with one embodiment. In one embodiment, active valve damper 38 includes eyelets 105 and 111, damper housing 120, helical spring 115, piston shaft 130, and piggyback (or external reservoir 125). In one embodiment, external reservoir 125 is described in U.S. Pat. No. 7,374,028 the content of which is entirely incorporated herein by reference.

In one embodiment, the damper housing 120 includes a piston and chamber and the external reservoir 125 includes a floating piston and pressurized gas to compensate for a reduction in volume in the main damper chamber of the damping assembly 38 as the piston shaft 130 moves into the damper body. Fluid communication between the main chamber of the damper and the external reservoir 125 may be via a flow channel including an adjustable needle valve. In its basic form, the damper works in conjunction with the helical spring and controls the speed of movement of the piston shaft by metering incompressible fluid from one side of the damper piston to the other, and additionally from the main chamber to the reservoir, during a compression stroke (and in reverse during the rebound or extension stroke).

Although a coil sprung damping assembly is shown in FIG. 2C, this is provided as one embodiment and for purposes of clarity. In one embodiment, the active valve damper 38 could be a different type such as, but not limited to, an air sprung fluid damper assembly as shown in FIG. 2B, a stand-alone fluid damper assembly, and the like.

Referring now to FIG. 3A, a block diagram of a controller 39 is shown in accordance with an embodiment. In one embodiment, suspension controller 39 includes a sensor data receiver 305, a sensor data evaluator 310, an active valve damper adjustor 313, a transmitter 325, and a timer 315.

In one embodiment, the information from suspension controller 39 is displayed on a graphical user interface (GUI) and/or human machine interface (HMI) such as an infotainment system HMI/GUI (e.g., in-vehicle infotainment (IVI) system, or the like). Further discussion and examples of an IVI control system and componentry are described in U.S. Pat. No. 10,933,710, the content of which is incorporated by reference herein, in its entirety.

In one embodiment, the IVI system may be integrated with the vehicle structure, suspension components, suspension component controller(s) and data processing system as described in U.S. Pat. Nos. 7,484,603; 8,838,335; 8,955,653; 9,303,712; 10,060,499; 10,443,671; and 10,737,546; the content of each of which are incorporated by reference herein, in their entirety. In one embodiment, the IVI system could incorporate vehicle systems consisting of one or more sensor(s), imagers, active valves, active damping components, suspension system controllers and the like. The principles of patents and other documents incorporated herein by reference, may be integrated one or more embodiments hereof, individually or in combination, as disclosed herein.

In one embodiment, controller 39 receives sensor data input 301 from one or more sensor(s) 35 and outputs a suspension adjustment command 328, a suspension return command 326, and information 329.

In general, the one or more sensor(s) 35 transmit sensor data input 301 when an event that is over a threshold is identified, as part of a cycle (e.g., a heartbeat check-in, etc.), as a radio event, or the like.

In one embodiment, the sensor data 301 could be data transmitted over a wireless mesh at a predetermined and/or dynamic interval. Moreover, in one embodiment, the transmission type, transmitted information, and/or transmission rate of sensor data 301 over a regular or a wireless mesh network could be based upon connected low-power and/or high precision sensors that may/or may not include additional microprocessors, and the like.

For example, in one embodiment, the wireless network is an intra-vehicle wireless network (such as a BAN) for data transmission between at least two components coupled with the vehicle, the at least two components including, but not limited to, at least one sensor, the controller, and at least one peripheral device (such as a smart component, switch, or the like) coupled with the vehicle. In one embodiment, the intra-vehicle wireless network is a wireless mesh network. In one embodiment, the intra-vehicle wireless network includes an intra-vehicle transmission authentication and encryption protocol.

In one embodiment, the information or data (e.g., message payload) provided in sensor data 301 will include additional information/data comprising the wireless network which is passed to and from peripheral devices in the network. Thus, in one embodiment, the wireless network communication and/or wireless mesh network will allow for information/data to be exchanged between adjacent vehicles, vehicle networks, etc. as described herein.

In one embodiment, the wireless network includes an inter-vehicle communication (IVC) wireless network for data transmission between the vehicle and at least another vehicle, between the vehicle and a mobile communications device distinct from the vehicle, between the vehicle and an infrastructure component (such as a traffic light, beacon on a stop sign, road mile marker, a benchmark, or the like). In one embodiment, the IVC wireless network is a wireless mesh network. In one embodiment, the IVC wireless network includes an IVC transmission authentication and encryption protocol.

In one embodiment, the IVC transmission authentication and encryption protocol is distinct and different from the intra-vehicle transmission authentication and encryption protocol, such that a device receiving a communication can determine the origin of the communication. In one embodiment, the origin of the communication is important depending upon the data provided in the communication. For example, a transmission that includes sensor provided information might only be verified and acted upon if it includes the intra-vehicle transmission authentication and encryption protocol (such as for security purposes discussed herein).

In one embodiment, the IVC transmission authentication and encryption protocol can include levels of trust. For example, a vehicle used by a friend may have a "trusted" IVC transmission authentication and encryption protocol that allows a sensor from the friend's vehicle to provide sensor data to the user's controller that is verified and acted upon as sensor data from a "trusted" peripheral. In contrast, when an IVC transmission includes sensor provided information but it does not have a "trusted" IVC transmission authentication and encryption protocol it would not be verified and acted upon. However, other information such as stop sign warnings, terrain changing information, or the like from IVC transmissions would be evaluated by the controller and may be used depending upon context, or the like.

In one embodiment, sensor data receiver 305 receives sensor data 301 from the one or more sensor(s) 35 (shown and described at least in FIGS. 1A-1B and 3B). In one embodiment, sensor data receiver 305 utilizes database 320 (or other memory solution) to collect and store the received sensor data 301.

In one embodiment, evaluator 310 determines a value of the event identified in the sensor data, and obtains a damper setting change for at least one damping characteristic of the active valve damper related to the event value. In one embodiment, the damper setting changes for at least one damping characteristic of the active valve damper are stored in performance database 322.

For example, in one embodiment, controller 39 can evaluate what task should be performed upon receipt of sensor data 301 from the sensor 35 by using evaluator 310 and information stored in performance database 322 to evaluate the event value and perform any of a number of tasks based upon the evaluation. For example, sensor data 301 could cause controller 39 to perform a task such as, but not limited to, firm up the suspension, soften the suspension, set the suspension to a predefined mapping (or suspension setup), or the like.

In one embodiment, depending upon the magnitude of the event, the receipt of sensor data 301 would cause controller 39 to instantly (or nearly instantly) soften the active suspension of one or more of the active dampers. For example, if the vehicle is about to, or is encountering an event such as a rock, root, bump, curb, pothole, or the like that causes a force above a certain threshold to be felt at the tire (such as the front tire) sensor data 301 would describe an event which identifies as an event that controller 39 should respond to by changing one or more active dampers into a softer mode (e.g., active damper 288) such that the force imparted by the event would be reduced before it is felt at the handlebars (or the seat, pedals, etc.).

In one embodiment, depending upon the magnitude of the event, the receipt of sensor data 301 would cause controller 39 to instantly (or nearly instantly) change the suspension to its firmest mode. For example, if the vehicle is about to, or is encountering an event such as an obstacle that would cause a harsh or dangerous condition (such as bottom out, roll over, or the like), sensor data 301 would describe an event which identifies as an event that controller 39 should respond to by changing one or more active dampers to a firm mode.

In one embodiment, controller 39 could be programmed with different actions to take upon receipt of sensor data 301 based on vehicle location, vehicle speed, terrain, vehicle load, or the like. For example, if controller 39 knows the vehicle is on a roadway, an event defined in sensor data 301 that is indicative of the suspension diving while the wheel is not being impacted by a force, would cause controller 39 to initiate a firming of the front suspension due to hard braking.

In one embodiment, active valve damper adjustor 313 is configured to monitor and adjust at least one damping characteristic of the at least one active valve damper (e.g., active valve damper 38 and/or active valve damper 288). That is, active valve damper adjustor 320 will provide adjustment command 328 to at least one active valve.

In one embodiment, transmitter 325 transmits a suspension adjustment command 328 to one or more active dampers. In one embodiment, the suspension adjustment command 328 is a command for the active damper to soften. For example, sensor data 301 includes information about an event that has occurred at a wheel (such as the front wheel for example), the event is a bump or the like that is above a threshold value. When controller 39 receives the event information, it is received, evaluated, active valve damper adjustor 320 will generate the suspension adjustment command 328 to soften the damper via an adjustment to at least one active valve of the damper, the transmitter 325 will then transmit the suspension adjustment command 328 to the damper (e.g., front fork damper 288).

Transmitter 325 will also transmit information 329 to sensor 35 (the sensor that provided the sensor data 301), to let sensor 35 know that the information was received. In other words, there is an acknowledgement and a payload.

In one embodiment, included in the information 329 may be additional information in addition to the message received indication. For example, in one embodiment, information 329 will include information such as event threshold values, upcoming changes to event threshold values, and the like. In one embodiment, information 329 will include additional communication protocols such as those described herein.

In one embodiment, timer 315 begins to toll when the sensor data 301 about the event is received. In one embodiment, the timer 315 will run for a certain amount of time. In one embodiment, the timer 315 is 0.5 seconds. However, in one embodiment, the timer could be set to another value or could be a value that is dependent upon location, terrain, or the like. In one embodiment, the length of time measured by the timer 315 is fixed e.g., set by a manufacturer. In one embodiment, the length of time measured by the timer 315 is adjustable by a manufacturer, a user, a mechanic, a technician, or the like.

Using the example where the timer is a 0.5 second timer, if no further sensor data 301 is received during the 0.5 seconds, then timer 315 will trigger a suspension return command 326 that will be transmitted to the damper (e.g., front fork damper 288 in this example). When front fork damper 288 receives the suspension return command 326, the active damper will dismiss the suspension adjustment command 328 override. In one embodiment, the suspension return command 326 will include information that will cause the active damper to return to its previous firmness settings, to a preprogrammed setting, to a new setting automatically determined by controller 39, to a location-based setting, a terrain-based setting, or the like.

If further sensor data 301 is received during the 0.5 seconds, then timer 315 will reset at the receipt of each new sensor data 301 (from the same sensor) and the 0.5 second countdown will begin anew. If there is no additional sensor data 301 received during the new timer countdown, then timer 315 will trigger the suspension return command 326 that will be transmitted to the damper (e.g., front fork damper 288).

In other words, when encountering successive bumps above the bump threshold, the sensor sends sensor data 301 (which would in one embodiment, be an above threshold message) at a rate of 10 Hz. When the terrain smooths out, the sensor stops sending sensor data 301 and timer 315 is no longer being reset with the sensor data 301 messages. Thus, using the above example, 0.5 seconds after the last sensor data 301 is received, timer 315 will expire and the suspension return command 326 is sent.

For example, during a ride, bicycle 50 encounters really bumpy terrain for 3 seconds and then the trail smooths out. At the first over threshold bump strike, bump sensor 35 sends sensor data 301 to controller 39. Controller 39 opens the suspension (e.g., softens the damping of damper 288). For the next 3 seconds, the bump sensor continues to send sensor data 301 at a rate of 10 Hz. During this period, the timer 315 is resetting as each sensor data 301 packet is received. When the trail smooths out (e.g., at the 3 second mark in this example), the last sensor data 301 message will have already been sent by the sensor 35. That is, after the trail smooths out, there would be no over threshold events, and thus no sensor data 301 data sent from sensor 35.

Because no more sensor data 301 messages are received, timer 315 is not reset and is allowed to run down to zero. When the timer 315 finishes, e.g., after the time period had tolled, the suspension return command 326 is triggered and sent by transmitter 325 to the one or more active damper components. Thus, using the above example, the suspension return command 326 is triggered and sent by transmitter 325 3.5 seconds after the first sensor data 301 message was received (e.g., 3 seconds of sensor data 301 messages plus the 0.5 second timer clock).

With reference now to FIG. 3B, a block diagram of a sensor 35 is shown in accordance with an embodiment. As discussed herein, in one embodiment, the bicycle 50 has wireless sensors 35 on the front and rear unsprung masses that communicate to a central controller 39. Although in one embodiment, the sensors are wireless bump sensors, in one embodiment they could be any type of wireless sensors such as one or more of those disclosed herein. Moreover, although sensors are one focus area, in one embodiment the technology can be used in any wireless peripheral where low latency and long battery life is important.

Further, in one embodiment, the acceleration (or other force) identified by event 331 is analyzed locally at the sensor 35. Only when data is read that exceeds the event threshold does the sensor 35 send a wireless message (e.g., sensor data 301) to the controller 39.

In one embodiment, sensor 35 includes a receiver 333, an evaluator 335, a memory 336, a transmitter 338, a timer 337, and a power source 339.

In one embodiment, sensor 35 generates data based on an event 331, receives information 329 from controller 39, and outputs sensor data 301 message and check-in message 340.

In one embodiment, power source 339 of sensor 35 is a CR2032 battery. In one embodiment, power source 339 is a different type of non-rechargeable battery.

In one embodiment, power source 339 is a rechargeable battery. In one embodiment, power source 339 can be recharged wired or wirelessly. For example, a power source 339 having a wirelessly rechargeable capability means it could be charged using a wireless power transfer system. E.g., using an inductive charger (or the like) within a given distance of the wirelessly rechargeable capability of the battery.

Wireless charging, in its most basic form utilizes a copper coil to create an oscillating magnetic field, which can create a current in one or more receiver antennas. In general, the wireless charger could be a charging pad that use tightly-coupled electromagnetic inductive or non-radiative charging; A charging bowl or through-surface type charger that uses loosely-coupled or radiative electromagnetic resonant charging to transmit a charge a few inches; An uncoupled radio frequency wireless charger that allows a trickle charging capability at distances of many feet, or the like.

Examples of a wireless power transfer systems that could be used in one or more embodiments include those defined by the wireless power consortium (WPC) Qi standard, the AirFuel Alliance (e.g., Duracell Powermat, PowerKiss, etc.), WiTricity, and the like.

In one embodiment, power source 339 is an energy harvesting switch that does not require a battery or other powered connection. As such, the energy harvesting switch is capable of operating for an indefinite amount of time without requiring any type of recharge, battery change, etc.

In one embodiment, the energy harvesting switch utilizes a momentary generator such as ZF electronics AFIG-0007 to provide power. In one embodiment, the energy harvesting switch includes an erasable programmable read-only memory. In one embodiment, the Eprom can be written to with RF energy, NFC protocols, or the like. In one embodiment, with an Eprom in the energy harvesting switch, a user could use a mobile device, NFC programmer, or the like to modify one or more of the transmission metrics, such as check-in, information broadcast, ID requirements, encryption, and the like.

In one embodiment, sensor 35 communicates wirelessly via a network such as WPAN, an LPAN, IoT connectivity, or the like. In one embodiment, the transmission protocol could be, but is not limited to, Bluetooth, WiFi, BLE, NFC, UHF radio signal, WiMax, LTE, ISM band, an IEEE 802.15.4 standard communicator, Zigbee, ANT, ISA100.11a, wireless HART protocol, MiWi, IPv6, 6LoWPAN, thread network protocol, SNAP, and the like.

In one embodiment, if the IEEE 802.15.4 standard is utilized to transmit sensor data 301, controller 39 can include an IEEE 802.2 logical link control sublayer to receive the sensor data 301 and provide its content to controller 39.

In one embodiment, if SNAP is utilized to transmit sensor data 301, controller 39 can have a universal asynchronous receiver/transmitter (UART) interface supporting RS-232 or RS-485 using TTL logic levels to receive the signal 393 and provide its content to controller 39.

In one embodiment, event threshold refers to an acceleration magnitude sufficient to trigger the suspension to go from closed to open. In other words, how big of a bump is required to make the suspension go to the open or soft mode. This is a powerful tuning parameter for the rider: with a higher bump threshold, the suspension will spend more time in the closed mode and thus feel more efficient yet less comfortable. Higher thresholds generally are associated with a more race-oriented experience. The opposite is true for lower bump thresholds. With a lower bump threshold, the suspension will spend more time in the open mode and thus feel more comfortable yet less efficient.

The event threshold value can also be a variable that is changed depending upon vehicle operations. For example, the event threshold for a bike going uphill can be different than the event threshold for a bike going across flat ground, and one or both of those event thresholds can be different than the event threshold for a bike going downhill.

In one embodiment, the event threshold value is based on vehicle location, vehicle speed, terrain, vehicle load, or the like. For example, when the vehicle is on a roadway, the suspension would be in a firmer setting and the event threshold could be low (such as an impact that causes the wheel to deflect 0.5 inches or more). In contrast, when the vehicle is on a gravel road, the suspension would be in a softer setting and the event threshold could be higher than the roadway threshold (such as an impact that causes the wheel to deflect 1 inch or more). In a highly active suspension, such as on a vehicle (e.g., mountain bike, or the like) being used off-road the event threshold could be at an even higher setting (such as an impact that causes the wheel to deflect 2 inches or more).

When the event magnitude is at or above the event threshold magnitude, it is reported by sensor 35. In one embodiment, the information about the event in the sensor data 301 will include a magnitude of the event, such that the controller 39 can evaluate the magnitude and provide the proper response, e.g., softening the suspension for an event with a magnitude indicative of a bump that is within a given suspension range, firming the suspension when the event has a magnitude indicative of a bottom out situation, and the like.

In one embodiment, the sensor receives the event threshold value from the controller. In one embodiment, the threshold value along with other optional data is embedded in the response from controller 39 to sensors 35 (e.g., info 329). In one embodiment, info 329 is provided during the initial paring handshake between sensor 35 and controller 39. In one embodiment, info 329 is provided by the controller as part of an acknowledgement response to a sensor data 301 message sent by the sensor 35. In one embodiment, info 329 is provided by the controller in response to a check-in 340 "heartbeat" message sent by the sensor 35. In one embodiment, the info 329 is sent at a 1 Hz communication rate.

In one embodiment, sensor data 301 includes a unique identifier (ID) that identifies the specific sensor 35 that broadcast the sensor data 301. Thus, even when a number of different sensors are operating in the same environment, the controller 39 will be able to identify which sensor 35 sent the signal 393. In one embodiment, the unique ID is used during the programming/pairing of sensor 35 with controller 39.

In one embodiment, the unique ID in sensor data 301 is used by controller 39 to identify a valid sensor 35, and the event information in sensor data 301 is used by controller 39 to identify the associated action to be taken. Although a unique ID is used in one embodiment, in another embodiment, a different identification methodology may be used to identify the sensor 35 and/or the associated action to be taken.

In one embodiment, the event threshold information, unique ID, and other sensor data is stored in an erasable programmable read-only memory (e.g., memory 336). In one embodiment, memory 336 can be written to with RF energy, NFC protocols, or the like. As such, the memory 336 could be updated via controller 39, mobile device 93, a laptop, or the like.

In one embodiment, once sensor 35 sends sensor data 301, it will remain active to listen for info 329 from controller 39. In one embodiment, info 329 is an acknowledgement signal and waiting for it would be programmed as part of the transmission and operation protocol within the sensor 35 operating system.

In one embodiment, once sensor 35 receives info 329, the sensor would return to a lower power state that is not listening for any transmitted signals. In one embodiment, sensor 35 would stay in the lower power state until an above magnitude event occurs. In one embodiment, the state of sensor 35 will follow the state of sensor flow diagram 375 of FIG. 3D, and described in the discussion of FIG. 3D.

In one embodiment, timer 337 of sensor 35 counts down a check-in or heartbeat time period. In one embodiment, the time period measured by timer 337 is preset by the manufacturer. In one embodiment, the time period measured by timer 337 is adjustably set by the manufacturer, by the user, by a mechanic, based on the vehicle location, terrain type, or the like.

In one embodiment, when timer 337 expires, a check-in message 340 is sent from sensor 35 to controller 39. The sensor 35 will then listen for info 329 from controller 39. In one embodiment, once info 329 is received, timer 337 will be restarted.

In one embodiment, if there is no response to check-in message 340 with a predefined period of time, the sensor 35 will send another check-in message 340. In one embodiment, if there is no response (e.g., info 329) received, the sensor will send an additional pre-defined number of check-in messages 340. If no response is received after the final check-in message of the pre-defined number, then sensor 35 will move to a disconnected operational state as shown in FIG. 3D and described in the associated discussion thereof.

Figure 3C:
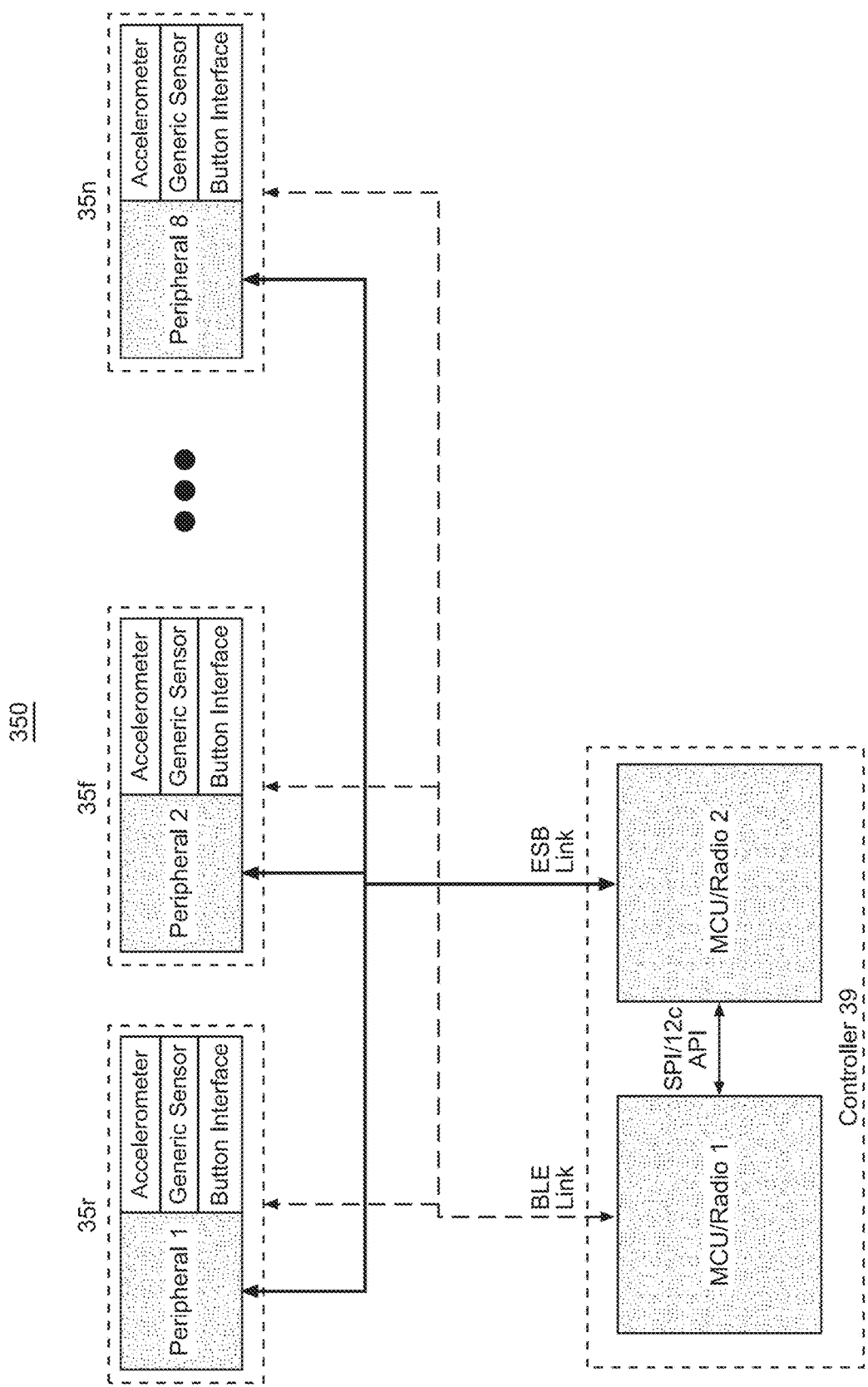
FIG. 3C is a block diagram of a wireless communication protocol, shown in accordance with an embodiment.
Figure 3D:
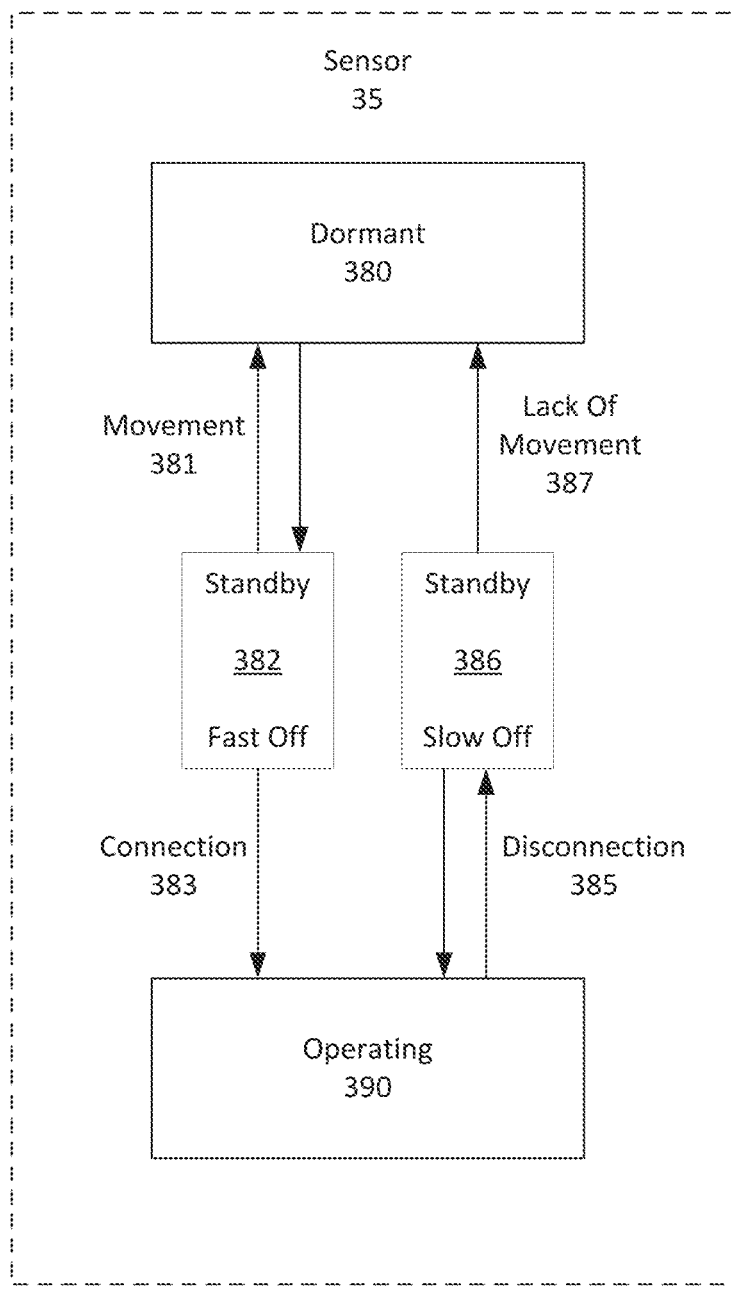
FIG. 3D is a flow diagram of a number of states of the sensor, shown in accordance with an embodiment.

Referring now to FIG. 3C, a flow diagram of a wireless communication protocol 350 is shown in accordance with an embodiment. In general, the goal of the communication protocol 350 is low latency and long battery life.

In one embodiment, the network implements a proprietary low-latency low-power radio protocol to provide an effective transport for communication between sensors (such as the rear bump sensor 35r, front bump sensor 35f, handlebar switch 93, another sensor 35n, and the like) (hereinafter "sensor(s) 35" for purposes of clarity) and the controller 39. In one embodiment, controller 39 acts in the receive role, always listening for messages from the sensor(s) 35. The sensor(s) 35 act in the transmit role, staying asleep until some time-sensitive data is ready to be sent (such as an at or above threshold event, a heartbeat check-in, or the like). When that data is ready to be sent, the sensor(s) 35 sends it, then, immediately after, listens for a response (e.g., info 329) from the controller 39. In one embodiment, the controller 39 will always try to respond with an acknowledgement, and optionally, some data in the response (e.g., info 329) back to the sensor(s) 35. After this exchange is complete, the sensor(s) 35 turns its radio off until the next time it wishes to send something to the controller 39.

In one embodiment, while the sensor(s) 35 radio is turned off, the controller 39 will know that any message sent to sensor(s) 35 will not be received. This means that the controller 39 can only send data to the sensor(s) 35, immediately after it receives a message (e.g., sensor data 301 and/or check-in 340) from sensor(s) 35. In so doing, the radio-on time on for sensor(s) 35 is minimized. Minimizing the radio-on time, reduces overall power consumption thereby providing a low latency connection from the sensor(s) 35 while still maintaining long battery lifetimes on the sensor 35.

In one embodiment, if the sensor(s) 35 has no data to send to the controller 39, it will periodically send a heartbeat (e.g., check-in 340), to provide the controller 39 with a means of communicating with the sensor(s) 35, as well as informing the controller 39 that the sensor(s) 35 is still active, and further confirming by sensor(s) 35 that there is still a connection with controller 39.

In one embodiment, the microprocessor on the sensor(s) 35 includes a radio capable of standard BLE and other communication as part of the ISM Band technologies. In one embodiment, sensor(s) 35 uses Enhanced ShockBurst (ESB). In one embodiment, the microprocessor on the sensor(s) 35 built in radio protocol could be, but is not limited to, WiFi, NFC, UHF radio signal, WiMax, LTE, ISM band, an IEEE 802.15.4 standard communicator, Zigbee, ANT, ISA100.11a, wireless HART protocol, MiWi, IPv6, 6LoWPAN, thread network protocol, SNAP, and the like.

In one embodiment, controller 39 of FIG. 3C has two wireless radios MCU radio 1 and MCU radio 2. In one embodiment, MCU radio one handles wireless communication with peripherals where latency and/or battery life is not a concern. For example, MCU radio one could communicate with devices such as other controllers, mobile phone 95 or an app thereon, a power meter, or the like where ~200 msec latency is not a problem.

In one embodiment, there are any number of BAN, wireless mesh, wired mesh, wired and wireless mesh networks supported by one or a plurality of MCU radios. The use of 2 radios is discussed herein for purposes of clarity and identifying how two or more radios could operate within the network.

Moreover, in one embodiment, the way the radios interact with one another doesn't necessarily have to be only over SPI orI2C. In contrast, in one embodiment, the radio(s) could work with other radios across their own networks, partial mesh networks, only secure networks, only unsecure networks, etc.

In one embodiment, MCU radio two handles the ESB communication and is dedicated to any low latency/low power devices such as front and rear bump sensors 35 and handlebar switch 93. This radio is always listening for a message from the bumper sensors 35.

In one embodiment, having two radios operating as shown in FIG. 3C is suboptimal from a battery life standpoint, but, in one embodiment, the controller 39 houses a relatively large rechargeable battery capable of running the suspension solenoids. Thus, the expectation for the controller battery burn time is hours not months. In one embodiment, the amount of power draw from the "always-listening" ESB radio is insignificant. However, the always-listening is key for low latency communication.

For example, when the bump sensor has a message to send, it can be nearly instantaneously received by the controller (or within 2 msec). It can be this quick because the central controller does not have to wake up and try to bond with the sensor (a strategy normally employed to conserve battery life). It is already awake and ready.

In one embodiment, the operation of the wireless communication protocol 350 is to pair the sensor(s) 35 to the controller 39. In one embodiment, the operation of the wireless communication protocol 350 will also include connecting peripheral devices in the network into the wireless network communication and/or wireless mesh network. In one embodiment, the operation of the wireless communication protocol 350 will allow for information/data to be exchanged between adjacent vehicles, vehicle networks, etc. as described herein.

Security

In one embodiment, the wireless communication pairing is made resistant against attempts made by unauthorized actors trying to attack and control the system by performing authentication and encryption between the wireless components. In general, examples of system attacks include, but are not limited to, replay attacks, impersonation, denial of service, and the like.

In one embodiment, replay attacks refers to actions such as, but not limited to, an attacker recording one or more of the messages and playing them back to the device which mistakenly interprets them as valid messages from the sensor(s).

In one embodiment, impersonation refers to actions such as, but not limited to, an attacker pretending to be a sensor, and sending one or more messages directly to the controller 39.

In one embodiment, denial of service refers to actions such as, but not limited to, an attacker sending one or more specially crafted messages that stop the system from working. Although a number of examples of system attacks are discussed herein, the examples are not exhaustive. In contrast, it is possible, and should be appreciated, that other types of system/communication attacks may be utilized.

In one embodiment, the authentication and encryption between the wireless components includes the utilization of AES 128, or the like. For example, in one embodiment, the pairing procedure sets up all state required for the radio protocol to be secure, including the AES-128 symmetric key. Whenever a device—sensor 35, controller 39, peripheral, etc.—is turned on, it generates a session-specific 4-byte nonce using a secure random number generator. This nonce is included in all communication between devices.

Within a single session, each device also stores a 4-byte sequence number, that starts at 0, and increments for every transmitted message. The AES-128 block cipher is operated in the Authenticated Encryption with Associated Data (AEAD) scheme, which allows encrypting the given plaintext, and authenticating associated plain text data. The AEAD scheme requires a 13-byte nonce value, referred to herein as AEADNonce. When the AES-128 symmetric key, and AEADNonce are unique for every packet, the connection is secured.

In one embodiment, the AEADNonce is constructed by concatenating the nonce of each device with the sequence number of the particular packet, for a total of 12 bytes, with the 13th byte padded with 00. This ensures the AEADNonce is unique, and the connection is therefore secure. In one embodiment, the application does not accept any packet which it receives that has a sequence number earlier than another packet it has already received. This ensures that replay attacks are not possible. To generate new packets with a valid sequence number, the attacker must know the AES-128 symmetric key.

In one embodiment, to perform this activity, any of a number of different communication protocols may be used. In one embodiment, once the pairing is completed and each component (e.g., peripherals 1, 2, and 8 for example) has the keys, the communication operation is turned over to ESB, BLE, or the like, for the fast-communication battery-saving state.

In one embodiment, the pairing of one or more of the sensors, controller(s), peripherals and the like, coupled with the vehicle is performed via an out-of-band method such as a proximity detection (e.g., any devices within a certain distance where the distance is defined by the size of the vehicle, an acoustic and/or ultrasonic technique that resonates through the vehicle (e.g., frame, body, etc.) to identify any devices attached to the vehicle, and the like.

In one embodiment, one or more of the sensors, controller(s), peripherals and the like that are coupled with the vehicle may be paired via a UI aspect. For example, when a device (e.g., a sensor, peripheral, etc.) is added to a vehicle, the device will automatically initiate the pairing process.

Wireless Communications

In various embodiments, communication between the components uses wireless communications such as described herein. In one embodiment, those wireless communications are Bluetooth communication channels. In one embodiment, the communications can use one, some, or all of the different Bluetooth channels to transmit and receive information. However, in some embodiments, where a larger data packet does not need to be communicated, the wireless communication can use smaller packed data transmission capabilities at higher transmission rates, such as available on Bluetooth 5 protocol. Thus, one embodiment, using the Bluetooth 5 protocol, allows the components on the vehicle to use a smaller data packet size with increased speed to provide a faster transmission rate between components.

For example, Bluetooth Low Energy (LE) uses 40 different frequency channels (PHY channels), separated by 2 MHz. Three of these channels are labeled primary advertisement channels, while the remaining 37 channels are for secondary advertisements and data channels for transfers during a connection. In general, advertisements are used by devices to broadcast data and info for other observer devices to discover and process. It allows the device to broadcast this information for multiple devices to discover without a connection between the observers and broadcaster.

The three primary advertisement channels (e.g., channels 37, 38 & 39) are divided into advertising events where each event can occur on each of the 3 advertising PHY channels (or a subset). In one embodiment, consecutive events start with the first advertising PHY channel (e.g. if advertisements start with channel 37, then each event will start with an advertisement packet sent on channel 37).

In contrast, secondary advertisement channels (e.g., same as the data channels used during a connection—channels 0-36) are not part of the advertisement event, but rather part of the extended advertisement event. These begin at the same time as the advertisement event on the primary channel and end with the last packet on the secondary channel. The secondary channels are used to offload data that would otherwise exist on the primary channel (e.g., auxiliary packets). In general, an advertisement packet on the primary channel contains the PHY channel and the offset to the start time of the extended advertisement packet. The secondary advertisement channel can use any LE PHY (Uncoded 1M PHY, Uncoded 2M PHY, or Coded S=8 or S=2 PHY). For example, advertisements will start with advertisement packets sent on the 3 primary channels (or a subset of these channels). Extra information can then be offloaded to the Secondary advertisement channels to allow for more data to be broadcast.

Bluetooth 5 utilizes extended advertisements, e.g., a way to advertise more (offloaded) data than what's allowed with legacy advertisements. In general, offloading is accomplished by first advertising on the primary channel that points to an auxiliary packet on the secondary channel. As such, advertising sets are used to send out different types of advertising events simultaneously. Each advertisement set will have different advertisement parameters such as advertising PDU type, advertising interval, and PHY.

When advertising on the LE Uncoded 1M PHY, scan requests and responses can take place on the same PHY channel as the original advertisement or be offloaded to the secondary channel. In some cases when advertising on the Uncoded PHY, connection requests and responses are offloaded to the secondary channel.

When advertising on the LE Coded PHY, scan requests, scan responses, connection requests, and connection responses are always offloaded to the secondary channel.

Another feature of Bluetooth 5 extended advertisements are periodic advertisements. These are used for broadcasting packets to devices at a set period between two unconnected devices, meaning that more than one device can listen and tune in on these periodic advertisements. They consist of advertisements sent at a fixed interval with the advertisement data changing from time to time.

For example, the primary advertisement channel is used to transmit an ADV_EXT_IND PDU type which holds information (Time offset, PHY . . . etc) that can be used to find an AUX_ADV_IND PDU packet. That packet, in turn, contains a SyncInfo field which defines the data needed to synchronize to periodic advertisement packets (e.g., AUX_SYNC_IND and AUX_CHAIN_IND) in a way similar to how connections are formed (channel map, hop sequence, which PHY . . . etc).

Therefore, a scanner can target an advertising device by first discovering the advertisement event on the primary channel, and then tuning into the appropriate secondary channel and timing based on information sent in the primary advertisement packet.

In one embodiment, connectable devices can utilize the extended advertisements to send more data and allow connections on the secondary advertising channels, which can help avoid interference and noise from other devices broadcasting on the primary channels. Moreover, using periodic advertisements can help in making the broadcasting device more consistently discovered and monitored, with the possibility of the broadcast data being updated to reflect certain attributes and aspects of the broadcasting device. For example, in the case where a scanning device is always present in the proximity of a broadcasting device, now this scanning device can more consistently "follow" the advertiser and monitor its updates more frequently.

In one embodiment, the higher throughput is achieved when the components in communication with each other are using the new LE 2M PHY. In addition, when utilizing the higher speed PHY, a lower power consumption is achieved (for a transfer of the same amount of data). This is due to the radio-on time being reduced without the transmit power being increased. The reduced radio-on time, in turn, improves coexistence with other wireless technologies within the 2.4 GHz spectrum as crosstalk opportunities are reduced.

In one embodiment, the LE data packet includes a preamble (1 byte-1M PHY, or 2 bytes-2M PHY), access address (4 bytes), PDU (2-257 bytes) and CRC (3 bytes). In one embodiment, PDU can be further broken down into an LL header (2 bytes), a payload (0-251 bytes), and an optional MIC (4 bytes). In one embodiment, the payload can be further broken down into L2CAP header (4 bytes) and ATT data (0-247 bytes). In one embodiment, the ATT data can be further broken down into ATT header (1-3 bytes) and ATT payload (up to 244 bytes). In one embodiment, the ATT header can be further broken down to an op code (1 byte) and an attribute handle (2 bytes).

In one embodiment, it is the ATT payload in Bluetooth 4.2 and 5 that increases the maximum ATT payload from 20 bytes (legacy) to up to 244 bytes of data using data length extensions (DLE).

As described herein, in one embodiment, higher throughput is also obtained by using "write without response or notifications" to transfer the data from the client to the server and from the server to the client. These operations remove the need for the other device to acknowledge receipt of the data and respond before the next block of data can be sent.

In general, there are a few factors that impact the data throughput of a BLE application including: PHY being used (LE 1M vs. LE 2M vs. LE Coded (S=2 or S=8)), connection interval, maximum number of packets per connection interval, ATT Maximum Transmission Unit (ATT MTU), DLE, operation type: e.g., write with response vs. write without response, indications vs. notifications, inter frame space (IFS): time gap between consequent packets (150 us), transmission of empty packets, packet overhead—not all bytes, in a packet, are used for the application payload, and the like.

In general, there are three PHYs in Bluetooth 5: the original 1 Mbps PHY, the new 2 Mbps, and the coded PHY (with S=2, or S=8). The PHY used will directly impact the maximum achievable data throughput as it determines the actual raw data rate in which packets are sent over the air.

The connection interval effectively determines how many packets can be sent during one connection event. The higher the value, the more packets can be sent in one connection event.

ATT MTU Determines the max amount of data that can be handled by the transmitter and receiver and which they can hold in their buffers. For example, with DLE enabled, the data transfer can be up to 251−4=247 bytes (after deducting the L2CAP Header size). After taking into account the ATT header (3 bytes), there are a remaining 244 bytes for the actual ATT payload data. If the MTU is at least 247 bytes then the MTU will fit into one single packet. If the MTU is greater than 247 bytes, then the MTU will span multiple packets causing the throughput to go down (because of the packet overhead and timing in between the packets).

IFS is the time interval between two consecutive packets on the same channel index. It is defined as the time from the end of the last bit of the previous packet to the start of the first bit of the subsequent packet (presently 150 µs).

In general, the Bluetooth version and PHY determine the raw data transfer rate. For example, using Bluetooth version 4.2 and the LE 1M PHY the transfer rate is at 1 Mbps. In contrast, using the Bluetooth 5 LE Coded PHY with S=8, the data rate goes down to 125 kbps.

The DLE, ATT MTU, connection interval, the maximum number of packets per connection interval, Operation, and IFS all determine the portion of the on-radio time that's utilized for actual data transfer.

In one embodiment, to optimize data throughput, DLE is enabled, LE 2M PHY is used, notifications and writes without responses is enabled, the ATT MTU value is set to be at least greater than 247 bytes, and the connection interval is set to allow for the maximum number of packets per connection interval.

In one embodiment, the wireless network includes a number of wireless communications protocols and optimization capabilities (e.g., communications optimizers or optimizations) to enhance the throughput, increase battery life, sort the relevance of overlapping communications, and the like.

In one embodiment, the wireless communications protocols and optimization capabilities provide a single radio protocol comprising dynamic parameters configured to adjust one or more parameters based on a real-time traffic communication versus a non-real-time traffic communication. In one embodiment, the wireless communications protocols and optimization capabilities provide a multiple radio protocol comprising dynamic parameters configured to adjust one or more parameters based on a real-time traffic communication versus a non-real-time traffic communication. In one embodiment, the wireless communications protocols and optimization capabilities use frequency-domain multiplexing to provide different logical transports for a real-time traffic communication versus a non-real-time traffic communication. In one embodiment, a first radio protocol is used for setup and a second radio protocol is used for low latency communications.

In one embodiment, the wireless communications protocols and optimization capabilities provide intelligent adjustment of radio operating parameters, where the parameters to be adjusted include, but are not limited to, a transmission power, a receiver sensitivity, and the like, in order to optimize battery life based on a link reliability, an interference potential, an interference susceptibility, and the like.

In one embodiment, the wireless communications protocols and optimization capabilities use an intelligent transmission scheduler to schedule activity for at least two components of the network.

In one embodiment, the wireless communications protocols and optimization capabilities use adaptive techniques to perform acts such as data minimization and link scheduling to reduce a power consumption and/or a transmission latency.

In one embodiment, the wireless communications protocols and optimization capabilities utilize communication interference resolution techniques such as frequency hopping, spread spectrum operations, code-division multiple access (CDMA), global system for mobiles (GSM), and the like to maintain BAN, intra-vehicle, and or inter-vehicle communication operations in a busy environment (e.g., at a race, gathering, rally, ride, festival, or the like). For example, when a plurality of different vehicles are within the same vicinity/spectrum and some or all of the vehicles have wireless communications occurring thereon.

In one embodiment, the communications module is a BMD-350. Although a BMD-350 module is disclosed herein as one embodiment of a communications module used in the present discussion, it should be appreciated that another embodiment may utilize a different communications module and/or different components, protocols, and the like.

In general, BMD-350 is a stand-alone Bluetooth 5 low energy (LE) module that can be used individually or as part of a Bluetooth mesh. BMS-350 is an ultra-low power module based on the nRF52832 SoC from Nordic Semiconductor. BMD-350 has an Arm® Cortex®-M4 with FPU 32-bit processor, embedded 2.4 GHz transceiver, and integrated antenna, to provide a complete RF.

BMD-350 includes an AES-128 security capability. The available LE connections include, concurrent central, observer, peripheral, and broadcaster roles with up to twenty concurrent connections along with one Observer and one Broadcaster (S132).

BMD-350 radio frequency range is 2.360 GHz to 2.500 GHz; the modulations are gaussian frequency-shift keying (GFSK) at 1 Mbps, 2 Mbps data rates. BMD-350 has a transmit power +4 dBm maximum, a receiver sensitivity −96 dBm (LE mode), and a ceramic chip antenna (1 dBi peak).

BMD-350 with the nRF52832 SoC supports the S132 (Bluetooth low energy Central and Peripheral), S212 (ANT) and S312 (ANT and Bluetooth low energy) SoftDevices.

BMD-350 current consumption are defined for the following settings:
 (1) transmit (TX) only @ +4 dBm, 0 dBm @ 3V, DCDC enabled 7.5 mA, 5.3 mA.
 (2) TX only @ +4 dBm, 0 dBm 16.6 mA, 11.6 mA.
 (3) receive (RX) only @ 1 Mbps @ 3V, DCDC enabled 5.4 mA.

(4) RX only @ 1 Mbps 11.7 mA.
(5) central processing unit (CPU) @ 64 MHz from flash, from RAM 7.4 mA, 6.7 mA.
(6) CPU @ 64 MHz from flash, from RAM @ 3V, DCDC 3.7 mA, 3.3 mA.
(7) System Off, On 0.3 µA, 1.2 µA.
(8) Additional current for RAM retention 30 nA/4 KB block.

In one embodiment, once the bumper sensor(s) 35 are connected to the controller 39, the ESB protocol (or similar ISM Band Technology) takes over. For example, as discussed herein, sensor(s) 35 periodically send a heartbeat message (e.g., check-in 340) to controller 39 to make sure the system is working properly. When the controller 39 responds to the heartbeat, it embeds configuration information back to memory 336 of the sensor(s) 35. This can include event magnitude threshold information for instance along with any other message.

In one embodiment, as sensor(s) 35 is operating it is reading the acceleration data at high frequency and also knows the event threshold value. When data comes in above the event threshold value, sensor(s) 35 sends sensor data 301 (e.g., an above threshold message) to the controller 39.

Since the controller 39 is always listening for a message from the sensor(s) 35, the controller will receive the message at the speed of the message being sent. In one embodiment, controller 39 will send info 329 (e.g., an acknowledgement message) back to the sensor(s) 35 which will be in a listening window. In one embodiment, embedded in info 329 is also the desired event threshold. This gives the controller two opportunities to update the sensors: through the periodic heartbeat acknowledgement and through the above threshold acknowledgement.

In one embodiment, when in bumpy terrain with successive above threshold acceleration events, the sensor(s) 35 will send sensor data 301 messages at a rate of 10 Hz (for example). Although the rate of 10 Hz is used herein, in one embodiment, the message rate could be higher or lower than 10 Hz.

In one embodiment, when the terrain is less bumpy and the acceleration events are below the event threshold, the sensor(s) 35 will not send any sensor data 301 messages to the controller 39.

In one embodiment, the communication latency is approximately 2.2 milliseconds. For example, the communication latency will include the Accelerometer I2C at 100 kHz which is approximately 1000 microseconds, the encryption is approximately 610 microseconds, and the time from transmission to usable data at controller 39 (includes radio time and decryption) is approximately 545 microseconds.

Sometimes a message will not be received properly by the controller 39 and an associated acknowledgement message (e.g., info 329) will not be returned to the sensor(s) 35. A message resend is then initiated. Each message resend attempt adds an average of 0.5 milliseconds latency. For example, if sensor(s) 35 does not receive an acknowledgement message (e.g., info 329) from the controller 39 within a given amount of time, the sensor(s) 35 sends the info 329 message again. For example, assume a 10% chance of message failure. In this case, there is a 10% chance of needing a second message attempt, a 1% chance of needing a 3rd message attempt, and a 0.1% chance of needing a 4th message attempt. Each message attempt adds about 0.5 milliseconds latency, so even a 4th message attempt will be within the "feel it at the handlebar" latency period.

Referring now to FIG. 3D is a flow diagram 375 of a number of states of the sensor in accordance with an embodiment. In one embodiment, the sensor can be in a number of different states to conserve battery life. Flow diagram 375 is one embodiment, that includes three states for the bump sensor 35 to utilize to conserve battery life. Although flow diagram 375 includes 3 states, in one embodiment there may be more or fewer energy states. The use of three states is provided herein as one embodiment and for purposes of clarity.

In the operating state 390, the sensor 35 is operating. This is the highest battery power consumption state. In the operating state 390, the sensor 35 is operating as shown in FIG. 3B. That is, the sensor 35 is receiving movement 381 from an event 331, determining if the event 331 meets or exceeds the report threshold, and if the event 331 meets or exceeds the threshold then sensor 35 user transmitter 338 to provide the sensor data 301 to controller 39. When the controller 39 replies with information 329, the sensor 35 knows that there is a connection 383 with controller 39.

In standby state 382, sensor 35 is awake and measuring accelerations and the sensor has a connection 383 with main controller 39. In standby state 382, the sensor is monitoring for any acceleration event(s) 331 that meet or exceed the pre-defined threshold. If an event does meet or exceed the pre-defined threshold, then sensor 35 will move into operating state 390 and transmit the sensor data 301 to controller 39. When main controller 39 responds to the transmission from the sensor 35 with information 329, sensor 35 will know that there is a connection 383 with controller 39, that the event has been received by controller 39, and that sensor 35 can return to standby state 382 until the next occurrence of an event 331 that meets or exceeds the threshold.

In contrast, if an event does meet or exceed the pre-defined threshold, then sensor 35 will move into operating state 390 and transmit the sensor data 301 to controller 39. However, the sensor 35 does not receive information 329 from the controller 39. In other words, the sensor 35 is getting no acknowledgements from the controller 39. In one embodiment, sensor 35 will include a programmed pre-defined number of attempts at transmitting the sensor data 301 to controller 39 before making the determination that there is a disconnection 385 in the communication between the sensor 35 and the controller 39.

In one embodiment, the pre-defined number of attempts is based on the transmission rate. For example, in one embodiment, we will assume that it takes 0.5 milliseconds of time for the sensor to sense an event 331, determine the event is larger than the predefined threshold, transmit the sensor data 301 to controller 39, for controller 39 to transmit the info 329 (e.g., a message received transmission to sensor 35) and also transmit suspension adjustment 328 to modify the damper setting (e.g., soften the damper using active valve 450) to the active valve 450, the active valve 450 to modify the damper setting.

If the time between the event 331 occurring (e.g., the front wheel hitting a bump) and the bump being felt by the rider at the handlebars is 1.5 milliseconds, then the pre-defined number of attempts taken by the sensor would be 3. Thus, the sensor will have tried as many times as possible (e.g., 0.5×3) to send the information before the event was transmitted to the rider via the handlebars.

In one embodiment, the number of times the sensor tries could be more or less. The use of three attempts is used in one embodiment. In another embodiment, the sensor could continue to send the message until the bump is felt by the rider at the seat (e.g., 3 milliseconds), till the rear tire passes the same event, or the like.

In one embodiment, if there are a number of events 331 that are continuing to occur, the sensor will send the sensor data 301 for each event. In one embodiment, the number of times the sensor 35 repeats the sending of the sensor data 301 for each individual event can depend upon the time interval between events.

For example, a first event 331 causes sensor 35 to send sensor data 301, sensor 35 does not receive a response (e.g., info 329) from controller 39 within the 0.5 millisecond window, and thus resends the first event sensor data 301. At 0.8 milliseconds, a second event 331 occurs that is also above the threshold, at that time, and in one embodiment, the sensor 35 will now send the second event sensor data 301 at the 0.8 millisecond mark and reset the timing such that the first event sensor data is no longer being sent and instead the second event sensor data 301 is repeated 0.5 seconds after the first broadcast of the second event sensor data 301. Thus, in one embodiment, if a new at or over threshold event occurs, the sensor 35 will send the latest event sensor data 301 and discard the sending/transmitting of any prior event sensor data.

In one embodiment, once the sensor 35 determines that the controller 39 is turned off (or otherwise not responding to the transmissions), sensor 35 will enter standby state 386 (e.g., an intermediate battery power consumption state), where sensor 35 is awake and measuring accelerations but there is a disconnection 385 between sensor 35 and main controller 39. In one embodiment, once in standby state 386, even if an above threshold event 331 occurs, sensor 35 will not move to operating state 390. Instead, sensor 35 will continue under the premise that controller 39 is turned off, or is otherwise not responding to sensor 35 with information 329.

In one embodiment, when in standby state 386, sensor 35 will try to connect with controller 39 each time a threshold event 331 occurs. In one embodiment, when in standby state 386, sensor 35 will only try to connect with controller 39 at predefined times such as when timer 315 determines that it is time to send a heartbeat to controller 39. In one embodiment, when in standby state 386, sensor 35 will try to connect with controller 39 each time a threshold event 331 occurs and try to connect with controller 39 at predefined times such as when timer 315 determines that it is time to send a heartbeat to controller 39.

In one embodiment, sensor 35 will remain in standby state 386 until the connection 383 with controller 39 is established, or until sensor 35 determines there is a lack of movement 387.

In one embodiment, if sensor 35 determines that the connection 383 with controller 39 is established (or re-established), sensor 35 will transition from standby state 386 to standby state 382.

In one embodiment, if sensor 35 determines there is a lack of movement 387, sensor 35 will transition from standby state 386 to dormant state 380.

In dormant state 380, the bike is stationary and the sensor(s) 34 are reading no accelerations, e.g., a lack of movement 387. For instance, the bike is in storage or otherwise parked and not being ridden. In one embodiment, when in dormant state 380, the sensor(s) 34 go into low-power mode. In one embodiment, while in dormant state 380, the sensor 35 will periodically wake up to check for accelerations (e.g., the bike is being ridden) or movement 381. If there is a lack of movement 387 (or accelerations), sensor 35 will remain in the dormant state 380, e.g., go back to sleep.

In contrast, if the sensor 35 determines that there is movement 381 (or accelerations) during the periodic wakeup, sensor 35 will change from dormant state 380 into standby state 382.

Thus, in one embodiment, sensor 35 can move between the different states fluidly using the model described above. In one embodiment, sensor 35 will try to remain in (or return to) the lowest powered state for the specific situation.

In one embodiment, based on the different states described above, the estimate of battery life for power source 339 in sensor 35 is determined using a duty cycle such as, for example, 2 hours per ride, 4 rides per week, 48 weeks per year.

In one embodiment, the power draw for each state is approximated as an average of 150 microamp draw during the active state (e.g., operating 390), an average of 32 microamp draw during the standby state (e.g., 382 and/or 386), an average of 1 microamp draw during the dormant stage 380.

In one embodiment, power source 339 of sensor 35 is a CR2032 battery. In a CR2032 battery, the capacity is approximately 173 mAh. As such, and based on the power draw for each state and the duty cycle example above, the expected battery life of the power source 339 of sensor 35 is 23 months. In one embodiment, if the duty cycle is different, the lifespan of the power source 339 will be different.

In one embodiment, a different power source 339 with a different capacity can be used. For example, to fit a smaller (or lighter) power source 339, a larger power source 339, or the like. For example, a road bike rider may want a smaller (or lighter) sensor as the reduction of weight is one of the most important goals. As such, the rider could use a sensor 35 with a smaller power source 339 and therefore swap the battery life (e.g., reduce the battery life from 23 months to a lower life span e.g., a few months, weeks, or the like), in order to obtain a weight savings.

In contrast, an avid mount bike rider may have a harder duty cycle, with more time of sensor 35 being in operating state 390, as such, the expected battery life for power source 339 would be reduced by the actual operation of sensor 35.

Example Active Valve

Figure 4:
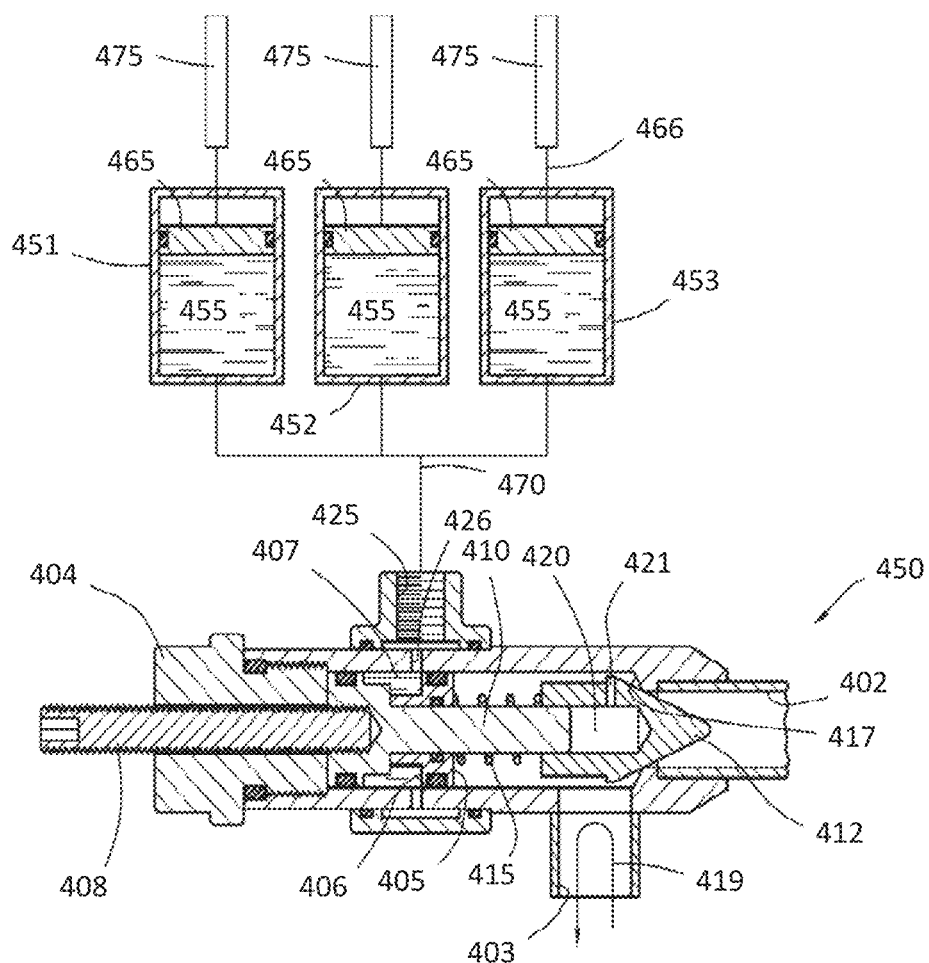
FIG. 4 is an enlarged section view showing an active valve and a plurality of valve operating cylinders in selective communication with an annular piston surface of the active valve, in accordance with an embodiment.

Referring now to FIG. 4, an enlarged view of an active valve 450 is shown in accordance with an embodiment. Although FIG. 4 shows the active valve 450 in a closed position (e.g., during a rebound stroke of the damper), the following discussion also includes the opening of active valve 450.

In the following discussion, the term "active", as used when referring to a valve or damping component, means adjustable, manipulatable, etc., during typical operation of the valve. For example, an active valve can have its operation changed to thereby alter a corresponding damping characteristic from a "soft" damping setting to a "firm" damping setting by, for example, adjusting a switch in a passenger compartment of a vehicle. Additionally, it will be understood that in some embodiments, an active valve may also be configured to automatically adjust its operation, and corresponding damping characteristics, based upon, for example, operational information pertaining to the vehicle and/or the suspension with which the valve is used.

Similarly, it will be understood that in some embodiments, an active valve may be configured to automatically adjust its operation, and corresponding damping characteristics, to provide damping based upon received user input settings (e.g., a user-selected "comfort" setting, a user-selected "sport" setting, and the like). Additionally, in many instances, an "active" valve is adjusted or manipulated electronically (e.g., using a powered solenoid, or the like) to alter the operation or characteristics of a valve and/or other component. As a result, in the field of suspension components and valves, the terms "active", "electronic", "electronically controlled", and the like, are often used interchangeably.

In the following discussion, the term "manual" as used when referring to a valve or damping component means manually adjustable, physically manipulatable, etc., without requiring disassembly of the valve, damping component, or suspension damper which includes the valve or damping component. In some instances, the manual adjustment or physical manipulation of the valve, damping component, or suspension damper, which includes the valve or damping component, occurs when the valve is in use. For example, a manual valve may be adjusted to change its operation to alter a corresponding damping characteristic from a "soft" damping setting to a "firm" damping setting by, for example, manually rotating a knob, pushing or pulling a lever, physically manipulating an air pressure control feature, manually operating a cable assembly, physically engaging a hydraulic unit, and the like. For purposes of the present discussion, such instances of manual adjustment/physical manipulation of the valve or component can occur before, during, and/or after "typical operation of the vehicle".

It should further be understood that a vehicle suspension may also be referred to using one or more of the terms "passive", "active", "semi-active" or "adaptive". As is typically used in the suspension art, the term "active suspension" refers to a vehicle suspension which controls the vertical movement of the wheels relative to vehicle. Moreover, "active suspensions" are conventionally defined as either a "pure active suspension" or a "semi-active suspension" (a "semi-active suspension" is also sometimes referred to as an "adaptive suspension").

In a conventional "pure active suspension", a motive source such as, for example, an actuator, is used to move (e.g., raise or lower) a wheel with respect to the vehicle. In a "semi-active suspension", no motive force/actuator is employed to adjust move (e.g., raise or lower) a wheel with respect to the vehicle. Rather, in a "semi-active suspension", the characteristics of the suspension (e.g., the firmness of the suspension) are altered during typical use to accommodate conditions of the terrain and/or the vehicle. Additionally, the term "passive suspension", refers to a vehicle suspension in which the characteristics of the suspension are not changeable during typical use, and no motive force/actuator is employed to adjust move (e.g., raise or lower) a wheel with respect to the vehicle. As such, it will be understood that an "active valve", as defined above, is well suited for use in a "pure active suspension" or a "semi-active suspension".

With reference still to FIG. 4, in one embodiment, Active valve 450 includes a valve body 404 housing a movable piston 405 which is sealed within the body. The piston 405 includes a sealed chamber 407 adjacent an annularly-shaped piston surface 406 at a first end thereof. The chamber 407 and annular piston surface 406 are in fluid communication with a port 425 accessed via opening 426. Two additional fluid communication points are provided in the body including an inlet 402 and an outlet 403 for fluid passing through the active valve 450.

Extending from a first end of the piston 405 is a shaft 410 having a cone-shaped valve member 412 (other shapes such as spherical or flat, with corresponding seats, will also work suitably well) disposed on an end thereof. The cone-shaped member 412 is telescopically mounted relative to, and movable on, the shaft 410 and is biased toward an extended position due to a spring 415 coaxially mounted on the shaft 410 between the member 412 and the piston 405. Due to the spring biasing, the cone-shaped member 412 normally seats itself against a seat 417 formed in an interior of the valve body 404.

As shown, the cone shaped member 412 is seated against seat 417 due to the force of the spring 415 and absent an opposite force from fluid entering the active valve 450 along orifice 402. As member 412 telescopes out, a gap 420 is formed between the end of the shaft 410 and an interior of member 412. A vent 421 is provided to relieve any pressure formed in the gap. With a fluid path through the active valve 450 (from 403 to 402) closed, fluid communication is substantially shut off from the rebound side of the cylinder into the valve body (and hence to the compression side) and its "dead-end" path is shown by arrow 419.

In one embodiment, there is a manual pre-load adjustment on the spring 415 permitting a user to hand-load or un-load the spring using a threaded member 408 that transmits motion of the piston 405 towards and away from the conical member, thereby changing the compression on the spring 415.

Also shown in FIG. 4 is a plurality of valve operating cylinders 451, 452, 453. In one embodiment, the cylinders each include a predetermined volume of fluid 455 that is selectively movable in and out of each cylindrical body through the action of a separate corresponding piston 465 and rod 466 for each cylindrical body. A fluid path 470 runs between each cylinder and port 425 of the valve body where annular piston surface 406 is exposed to the fluid.

Because each cylinder has a specific volume of substantially incompressible fluid and because the volume of the sealed chamber 407 adjacent the annular piston surface 406 is known, the fluid contents of each cylinder can be used, individually, sequentially or simultaneously to move the piston a specific distance, thereby effecting the damping characteristics of the system in a relatively predetermined and precise way.

While the cylinders 451-453 can be operated in any fashion, in the embodiment shown each piston 465 and rod 466 is individually operated by a solenoid 475 and each solenoid, in turn, is operable from a remote location of the vehicle, like a cab of a motor vehicle or even the handlebar area of a motor or bicycle (not shown). Electrical power to the solenoids 475 is available from an existing power source of a vehicle or is supplied from its own source, such as on-board batteries. Because the cylinders may be operated by battery or other electric power or even manually (e.g., by syringe type plunger), there is no requirement that a so-equipped suspension rely on any pressurized vehicle hydraulic system (e.g., steering, brakes) for operation. Further, because of the fixed volume interaction with the bottom out valve there is no issue involved in stepping from hydraulic system pressure to desired suspension bottom out operating pressure.

In one embodiment, e.g., when active valve 450 is in the damping-open position, fluid flow through orifice 402 provides adequate force on the member 412 to urge it backwards, at least partially loading the spring 415 and creating a fluid flow path from the orifice 402 into and through orifice 403.

The characteristics of the spring 415 are typically chosen to permit active valve 450 (e.g., member 412) to open at a predetermined pressure, with a predetermined amount of control pressure applied to port 425. For a given spring 415, higher control pressure at port 425 will result in higher pressure required to open the active valve 450 and correspondingly higher damping resistance in orifice 402. In one embodiment, the control pressure at port 425 is raised high enough to effectively "lock" the active valve closed resulting in a substantially rigid compression damper (particularly true when a solid damping piston is also used).

In one embodiment, the valve is open in both directions when the valve member 412 is "topped out" against valve body 404. In another embodiment however, when the valve piston 405 is abutted or "topped out" against valve body 404 the spring 415 and relative dimensions of the active valve 450 still allow for the cone member 412 to engage the valve seat 417 thereby closing the valve. In such embodiment backflow from the rebound side to the compression side is always substantially closed and cracking pressure from flow along orifice 402 is determined by the pre-compression in the spring 415. In such embodiment, additional fluid pressure may be added to the inlet through port 425 to increase the cracking pressure for flow along orifice 402 and thereby increase compression damping. It is generally noteworthy that while the descriptions herein often relate to compression damping and rebound shut off, some or all of the channels (or channel) on a given suspension unit may be configured to allow rebound damping and shut off or impede compression damping.

While the examples illustrated relate to manual operation and automated operation based upon specific parameters, in various embodiments, active valve 450 can be remotely-operated and can be used in a variety of ways with many different driving and road variables and/or utilized at any point during use of a vehicle. In one example, active valve 450 is controlled based upon vehicle speed in conjunction with the angular location of the vehicle's steering wheel. In this manner, by sensing the steering wheel turn severity (angle of rotation), additional damping (by adjusting the corresponding size of the opening of orifice 402 by causing nipple 412 to open, close, or partially close orifice 402) can be applied to one shock absorber or one set of vehicle shock absorbers on one side of the vehicle (suitable for example to mitigate cornering roll) in the event of a sharp turn at a relatively high speed.

In another example, a transducer, such as an accelerometer, measures other aspects of the vehicle's suspension system, like axle force and/or moments applied to various parts of the vehicle, like steering tie rods, and directs change to position of active valve 450 (and corresponding change to the working size of the opening of orifice 402 by causing nipple 412 to open, close, or partially close orifice 402) in response thereto. In another example, active valve 450 is controlled at least in part by a pressure transducer measuring pressure in a vehicle tire and adding damping characteristics to some or all of the wheels (by adjusting the working size of the opening of orifice 402 by causing nipple 412 to open, close, or partially close orifice 402) in the event of, for example, an increased or decreased pressure reading.

In one embodiment, active valve 450 is controlled in response to braking pressure (as measured, for example, by a brake pedal (or lever) sensor or brake fluid pressure sensor or accelerometer). In still another example, a parameter might include a gyroscopic mechanism that monitors vehicle trajectory and identifies a "spin-out" or other loss of control condition and adds and/or reduces damping to some or all of the vehicle's dampers (by adjusting the working size of the opening of orifice 402 by causing nipple 412 to open, close, or partially close orifice 402 chambers) in the event of a loss of control to help the operator of the vehicle to regain control.

For example, active valve 450, when open, permits a first flow rate of the working fluid through orifice 402. In contrast, when active valve 450 is partially closed, a second flow rate of the working fluid though orifice 402 occurs. The second flow rate is less than the first flow rate but greater than no flow rate. When active valve 450 is completely closed, the flow rate of the working fluid though orifice 402 is statistically zero.

In one embodiment, instead of (or in addition to) restricting the flow through orifice 402, active valve 450 can vary a flow rate through an inlet or outlet passage within the active valve 450, itself. In other words, the active valve, can be used to meter the working fluid flow (e.g., control the rate of working fluid flow) with/or without adjusting the flow rate through orifice. Additional information regarding active and semi-active valves, including those used for compression and/or rebound stiffness adjustments, preload adjustments, bottom-out control, preload adjustment, ride height adjustment, and the like see, as an example, the electronic valve of U.S. Pat. Nos. 9,353,818 and 9,623,716 the content of which are incorporated by reference herein, in their entirety. Thus, the active valve 450, can be used to meter the working fluid flow (e.g., control the rate of working fluid flow) with/or without adjusting the flow rate through orifice 402.

Due to the active valve 450 arrangement, a relatively small solenoid (using relatively low amounts of power) can generate relatively large damping forces. Furthermore, due to incompressible fluid inside the damping assembly 200, damping occurs as the distance between nipple 412 and orifice 402 is reduced. The result is a controllable damping rate. Additional active and semi-active valve features are described and shown in U.S. Pat. Nos. 8,627,932; 8,857,580; 9,033,122; 9,120,362; and 9,239,090 the content of which are incorporated by reference herein, in their entirety.

It should be appreciated that when the body 404 rotates in a reverse direction than that described above and herein, the nipple 412 moves away from orifice 402 providing at least a partially opened fluid path.

Figure 5:
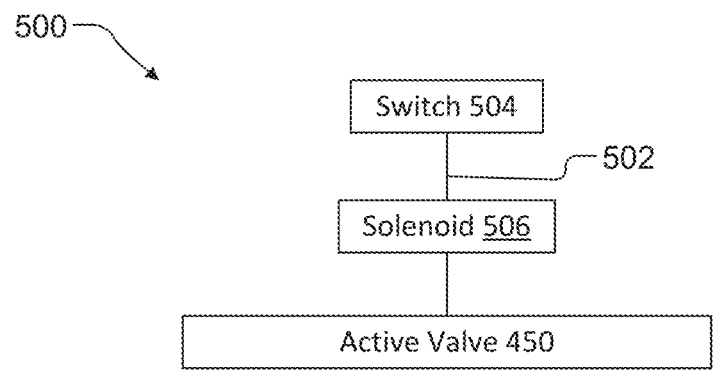
FIG. 5 is a schematic diagram showing a control arrangement for an active valve, in accordance with an embodiment.

FIG. 5 is a schematic diagram showing a control arrangement 500 for a remotely-operated active valve 450. As illustrated, a signal line 502 runs from a switch 504 to a solenoid 506. Thereafter, the solenoid 506 converts electrical energy into mechanical movement and rotates body 404 within active valve 450, In one embodiment, the rotation of body 404 causes an indexing ring consisting of two opposing, outwardly spring-biased balls to rotate among indentions formed on an inside diameter of a lock ring.

As the body 404 rotates, nipple 412 at an opposite end of the valve is advanced or withdrawn from an opening in orifice 402. For example, the body 404 is rotationally engaged with the nipple 412. A male hex member extends from an end of the body 404 into a female hex profile bore formed in the nipple 412. Such engagement transmits rotation from the body 404 to the nipple 412 while allowing axial displacement of the nipple 412 relative to the body 404. Therefore, while the body does not axially move upon rotation, the threaded nipple 412 interacts with mating threads formed on an inside diameter of the bore to transmit axial motion, resulting from rotation and based on the pitch of the threads, of the nipple 412 towards or away from an orifice 402, between a closed position, a partially open position, and a fully or completely open position.

Adjusting the opening of orifice 402 modifies the flowrate of the fluid through active valve 450 thereby varying the stiffness of a corresponding damping assembly 200. While FIG. 5 is simplified and involves control of a single active valve 450, it will be understood that any number of active valves corresponding to any number of fluid channels (e.g., bypass channels, external reservoir channels, bottom out channels, etc.) for a corresponding number of vehicle suspension dampers could be used alone or in combination. That is, one or more active valves could be operated simultaneously or separately depending upon needs in a vehicular suspension system.

For example, a suspension damper could have one, a combination of, or each of an active valve(s): for a bottom out control, an internal bypass, for an external bypass, for a fluid conduit to the external reservoir 125, etc. In other words, anywhere there is a fluid flow path within a damping assembly 200, an active valve could be used. Moreover, the active valve could be alone or used in combination with other active valves at other fluid flow paths to automate one or more of the damping performance characteristics of the damping assembly. Moreover, additional switches could permit individual operation of separate active bottom out valves.

Figure 6:
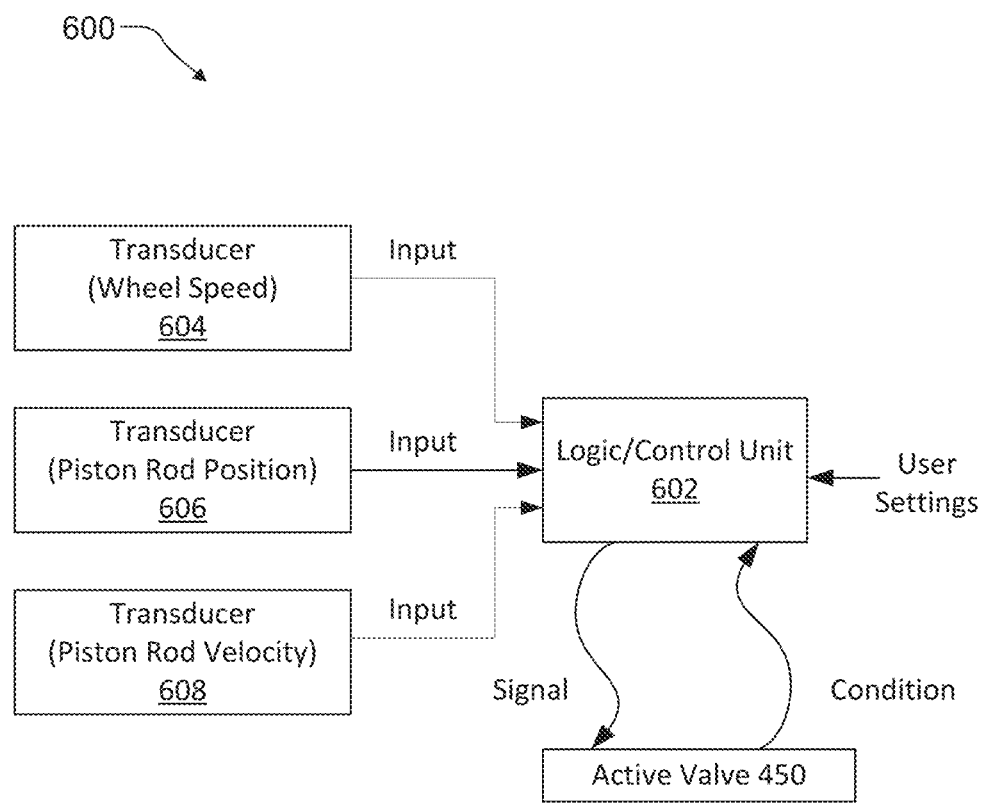
FIG. 6 is a schematic diagram of a control system based upon any or all of vehicle speed, damper rod speed, and damper rod position, in accordance with an embodiment.

In addition to, or in lieu of, the simple, switch-operated remote arrangement of FIG. 5, the remotely-operable active valve 450 can be operated automatically based upon one or more driving conditions, and/or automatically or manually utilized at any point during use of a vehicle. FIG. 6 shows a schematic diagram of a control system 600 based upon any or all of vehicle sensor information to include speed, damper rod speed, damper rod position, bump sensor, wheel acceleration, and the like. One embodiment of the arrangement of FIG. 6 is designed to automatically increase damping in a shock absorber in the event a damper rod reaches a certain velocity in its travel towards the bottom end of a damper at a predetermined speed of the vehicle.

In one embodiment, the control system 600 adds damping (and control) in the event of rapid operation (e.g., high rod velocity) of the damping assembly 200 to avoid a bottoming out of the damper rod as well as a loss of control that can accompany rapid compression of a shock absorber with a relative long amount of travel. In one embodiment, the control system 600 adds damping (e.g., adjusts the size of the opening of orifice 402 by causing nipple 412 to open, close, or partially close orifice 402) in the event that the rod velocity in compression is relatively low but the rod progresses past a certain point in the travel.

Such configuration aids in stabilizing the vehicle against excessive low-rate suspension movement events such as cornering roll, braking and acceleration yaw and pitch and "g-out."

FIG. 6 illustrates, for example, a control system 600 including three variables: wheel speed, corresponding to the speed of a vehicle component (measured by wheel speed transducer 604), piston rod position (measured by piston rod position transducer 606), and piston rod velocity (measured by piston rod velocity transducer 608). Any or all of the variables shown may be considered by logic unit 602 in controlling the solenoids or other motive sources coupled to active valve 450 for changing the working size of the opening of orifice 402 by causing nipple 412 to open, close, or partially close orifice 402. Any other suitable vehicle operation variable may be used in addition to or in lieu of the variables discussed herein, such as, for example, piston rod compression strain, eyelet strain, vehicle mounted accelerometer (or tilt/inclinometer) data or any other suitable vehicle or component performance data.

In one embodiment, the piston's position within the damping chamber is determined using an accelerometer to sense modal resonance of the suspension damper. Such resonance will change depending on the position of the piston and an on-board processor (computer) is calibrated to correlate resonance with axial position. In one embodiment, a suitable proximity sensor or linear coil transducer or other electro-magnetic transducer is incorporated in the damping chamber to provide a sensor to monitor the position and/or speed of the piston (and suitable magnetic tag) with respect to a housing of the suspension damper.

In one embodiment, the magnetic transducer includes a waveguide and a magnet, such as a doughnut (toroidal) magnet that is joined to the cylinder and oriented such that the magnetic field generated by the magnet passes through the rod and the waveguide. Electric pulses are applied to the waveguide from a pulse generator that provides a stream of electric pulses, each of which is also provided to a signal processing circuit for timing purposes. When the electric pulse is applied to the waveguide, a magnetic field is formed surrounding the waveguide. Interaction of this field with the magnetic field from the magnet causes a torsional strain wave pulse to be launched in the waveguide in both directions away from the magnet. A coil assembly and sensing tape is joined to the waveguide. The strain wave causes a dynamic effect in the permeability of the sensing tape which is biased with a permanent magnetic field by the magnet. The dynamic effect in the magnetic field of the coil assembly due to the strain wave pulse, results in an output signal from the coil assembly that is provided to the signal processing circuit along signal lines.

By comparing the time of application of a particular electric pulse and a time of return of a sonic torsional strain wave pulse back along the waveguide, the signal processing circuit can calculate a distance of the magnet from the coil assembly or the relative velocity between the waveguide and the magnet. The signal processing circuit provides an output signal, which is digital or analog, proportional to the calculated distance and/or velocity. Additional examples and embodiments for transducer-operated arrangement for measuring piston rod speed and velocity are described in U.S. Pat. Nos. 9,623,716 and 10,036,443 the content of which is incorporated by reference herein, in its entirety.

While transducers located at the suspension damper measure piston rod velocity (piston rod velocity transducer 608), and piston rod position (piston rod position transducer 606), a separate wheel speed transducer 604 for sensing the rotational speed of a wheel about an axle includes housing fixed to the axle and containing therein, for example, two permanent magnets. In one embodiment, the magnets are arranged such that an elongated pole piece commonly abuts first surfaces of each of the magnets, such surfaces being of like polarity. Two inductive coils having flux-conductive cores axially passing therethrough abut each of the magnets on second surfaces thereof, the second surfaces of the magnets again being of like polarity with respect to each other and of opposite polarity with respect to the first surfaces. Additional examples and embodiments of wheel speed transducers are described in U.S. Pat. Nos. 9,033,122; 9,452,654; 10,040,329; 10,047,817; 10,060,499 the content of which are incorporated by reference herein, in their entirety.

In one embodiment, as illustrated in FIG. 6, the logic unit 602 with user-definable settings receives inputs from piston rod position transducer 606, piston rod velocity transducer 608, as well as wheel speed transducer 604. Logic unit 602 is user-programmable and, depending on the needs of the operator, logic unit 602 records the variables and, then, if certain criteria are met, logic unit 602 sends its own signal to active valve 450 (e.g., the logic unit 602 is an activation signal provider) to cause active valve 450 to move into the desired state (e.g., adjust the flow rate by adjusting the distance between nipple 412 and orifice 402). Thereafter, the condition, state or position of active valve 450 is relayed back to logic unit 602 via an active valve monitor or the like.

In one embodiment, logic unit 602 shown in FIG. 6 assumes a single active valve 450 corresponding to a single orifice 402 of a single damping assembly 200, but logic unit 602 is usable with any number of active valves or groups of active valves corresponding to any number of orifices, or groups of orifices. For instance, the suspension dampers on one side of the vehicle can be acted upon while the vehicles other suspension dampers remain unaffected.

Figure 7:
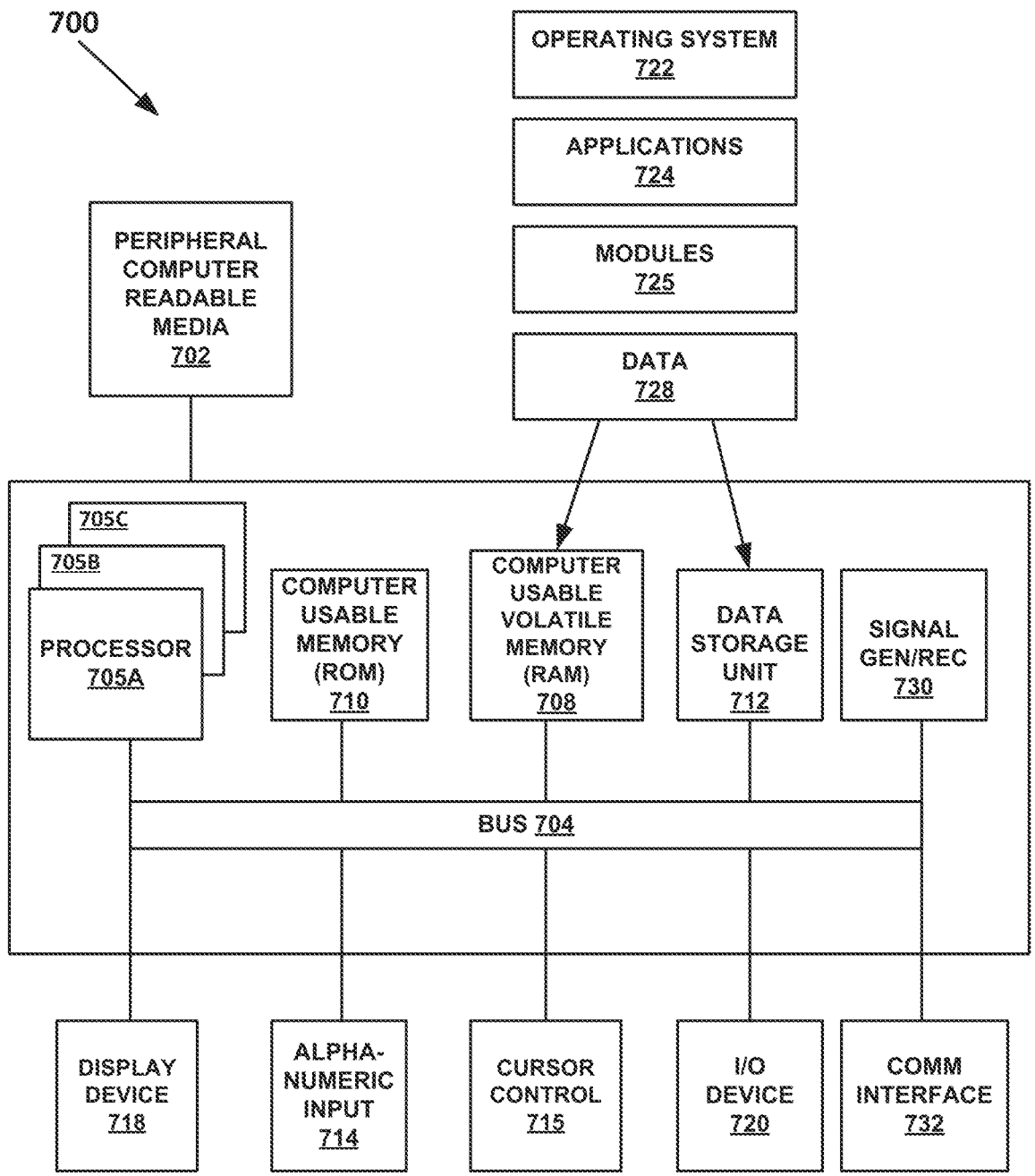
FIG. 7 is a block diagram of a computer system, in accordance with an embodiment.

With reference now to FIG. 7, an example computer system 700 is shown. In the following discussion, computer system 700 is representative of a system or components that may be used with aspects of the present technology. In one embodiment, different computing environments will only use some of the components shown in computer system 700.

In general, suspension controller 39 can include some or all of the components of computer system 700. In different embodiments, suspension controller 39 can include communication capabilities (e.g., wired such as ports or the like, and/or wirelessly such as communication transmitted via a network such as WPAN, an LPAN, IoT connectivity, or the like. In one embodiment, the transmission protocol could be, but is not limited to, Bluetooth, WiFi, BLE, NFC, UHF radio signal, WiMax, LTE, ISM band, an IEEE 802.15.4 standard communicator, Zigbee, ANT, ISA100.11a, wireless HART protocol, MiWi, IPv6, 6LoWPAN, thread network protocol, SNAP, and the like) such that some of the components of computer system 700 are found on suspension controller 39 while other components could be ancillary but communicatively coupled thereto (such as a mobile device, tablet, computer system or the like).

For example, in one embodiment, suspension controller 39 can be communicatively coupled to one or more different computing systems to allow a user (or manufacturer, tuner, technician, etc.) to adjust or modify any or all of the programming stored in suspension controller 39. In one embodiment, the programming includes computer-readable and computer-executable instructions that reside, for example, in non-transitory computer-readable medium (or storage media, etc.) of suspension controller 39 and/or computer system 700.

In one embodiment, computer system 700 includes peripheral computer readable media 702 which can include media such as, for example, an external storage drive, a compact disc, a flash memory, a universal serial bus (USB) flash memory, secure digital (SD) memory, MultiMediaCard (MMC) memory, an extreme Digital (XD) memory, a CompactFlash memory, a MemoryStick memory, a SmartMedia memory, and the like. In one embodiment, computer system 700 also includes an address/data/control bus 704 for communicating information, and a processor 705A coupled to bus 704 for processing information and instructions. As depicted in FIG. 7, computer system 700 is also well suited to a multi-processor environment in which a plurality of processors 705A, 705B, and 705C are present. Conversely, computer system 700 is also well suited to having a single processor such as, for example, processor 705A. Processors 705A, 705B, and 705C may be any of various types of microprocessors. Computer system 700 also includes data storage features such as a computer usable volatile memory 708, e.g., random access memory (RAM), coupled to bus 704 for storing information and instructions for processors 705A, 705B, and 705C.

Computer system 700 also includes computer usable non-volatile memory 710, e.g., read only memory (ROM), coupled to bus 704 for storing static information and instructions for processors 705A, 705B, and 705C. Also present in computer system 700 is a data storage unit 712 (e.g., a magnetic disk drive, optical disk drive, solid state drive (SSD), and the like) coupled to bus 704 for storing information and instructions. Computer system 700 also can optionally include an alpha-numeric input device 714 including alphanumeric and function keys coupled to bus 704 for communicating information and command selections to processor 705A or processors 705A, 705B, and 705C. Computer system 700 also can optionally include a cursor control device 715 coupled to bus 704 for communicating user input information and command selections to processor 705A or processors 705A, 705B, and 705C. Cursor control device may be a touch sensor, gesture recognition device, and the like. Computer system 700 of the present embodiment can optionally include a display device 718 coupled to bus 704 for displaying information.

Referring still to FIG. 7, display device 718 of FIG. 7 may be a liquid crystal device, cathode ray tube, OLED, plasma display device or other display device suitable for creating graphic images and alpha-numeric characters recognizable to a user. Cursor control device 715 allows the computer user to dynamically signal the movement of a visible symbol (cursor) on a display screen of display device 718. Many implementations of cursor control device 715 are known in the art including a trackball, mouse, touch pad, joystick, non-contact input, gesture recognition, voice commands, bio recognition, and the like. In addition, special keys on alpha-numeric input device 714 capable of signaling movement of a given direction or manner of displacement. Alternatively, it will be appreciated that a cursor can be directed and/or activated via input from alpha-numeric input device 714 using special keys and key sequence commands.

Computer system 700 is also well suited to having a cursor directed by other means such as, for example, voice commands. Computer system 700 also includes an I/O device 720 for coupling computer system 700 with external entities. For example, in one embodiment, I/O device 720 is a modem for enabling wired or wireless communications between computer system 700 and an external network such as, but not limited to, the Internet or intranet. A more detailed discussion of the present technology is found below.

Referring still to FIG. 7, various other components are depicted for computer system 700. Specifically, when present, an operating system 722, applications 724, modules 725, and data 728 are shown as typically residing in one or some combination of computer usable volatile memory 708, e.g., random-access memory (RAM), and data storage unit 712. However, it is appreciated that in some embodiments, operating system 722 may be stored in other locations such as on a network or on a flash drive; and that further, operating system 722 may be accessed from a remote location via, for example, a coupling to the Internet. The present technology may be applied to one or more elements of described computer system 700.

Computer system 700 also includes one or more signal generating and receiving device(s) 730 coupled with bus 704 for enabling computer system 700 to interface with other electronic devices and computer systems. Signal generating and receiving device(s) 730 of the present embodiment may include wired serial adaptors, modems, and network adaptors, wireless modems, and wireless network adaptors, and other such communication technology. The signal generating and receiving device(s) 730 may work in conjunction with one (or more) communication interface 732 for coupling information to and/or from computer system 700. Communication interface 732 may include a serial port, parallel port, Universal Serial Bus (USB), Ethernet port, Bluetooth, thunderbolt, near field communications port, WiFi, Cellular modem, or other input/output interface. Communication interface 732 may physically, electrically, optically, or wirelessly (e.g., via radio frequency) couple computer system 700 with another device, such as a mobile phone, radio, or computer system.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the Claims.

Reference throughout this document to "one embodiment," "certain embodiments," "an embodiment," "various embodiments," "some embodiments," "various embodiments", or similar term, means that a particular feature, structure, or characteristic described in connection with that embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A wireless active suspension system comprising:
   at least one sensor mounted to an unsprung mass of a vehicle, said at least one sensor comprising a low-power wireless communication capability,
      said at least one sensor to send a sensor data transmission, wherein said at least one sensor utilizes an enhanced shockburst (ESB) protocol for said sensor data transmission, said at least one sensor having a receiver, said at least one sensor having a dormant state, said at least one sensor periodically exiting said dormant state to determine if there is movement of said vehicle; and
   a controller in wireless communication with said at least one sensor, wherein said controller receives said sensor data from said at least one sensor, and communicates an adjustment command to modify at least one damping characteristic of at least one damper coupled to said vehicle, said at least one sensor configured to only activate said receiver after said at least one sensor has sent said sensor data transmission to said controller.

2. The wireless active suspension system of claim 1, wherein said at least one damper is part of a vehicle suspension, said at least one damper comprising:
   at least one active valve, wherein said at least one active valve is used to modify said at least one damping characteristic.

3. The wireless active suspension system of claim 1, wherein said sensor further comprises:
   an energy harvesting device as a power source for said sensor.

4. The wireless active suspension system of claim 1, further comprising:
   an intra-vehicle wireless network for a data transmission between at least two components coupled with said vehicle, said at least two components selected from a group consisting of: said at least one sensor, said controller, and a peripheral device coupled with said vehicle.

5. The wireless active suspension system of claim 4, further comprising:
   a transmission authentication and encryption protocol for said intra-vehicle wireless network.

6. The wireless active suspension system of claim 5, wherein said transmission authentication and encryption protocol protects said intra-vehicle wireless network from an unauthorized actor attempting an attack from a group consisting of: a replay attack, an impersonation, and a denial of service.

7. The wireless active suspension system of claim 1, further comprising:
   an inter-vehicle communication (IVC) wireless network for a data transmission from a group consisting of: between said vehicle and at least another vehicle, between said vehicle and a mobile communications device distinct from said vehicle, between said vehicle and an infrastructure component.

8. The wireless active suspension system of claim 7, further comprising:
   a transmission authentication and encryption protocol for said inter-vehicle wireless network.

9. The wireless active suspension system of claim 1, further comprising:
   a group of sensors mounted to said unsprung mass of said vehicle, at least two sensors, of said group of sensors, comprising a low-power wireless communication capability.

10. The wireless active suspension system of claim 1, further comprising:
    said at least one sensor to send said sensor data transmission when an event above a pre-defined event threshold is detected.

11. The wireless active suspension system of claim 1, further comprising:
    said at least one sensor to send said sensor data transmission when a time period has expired, wherein said time period is selected from a group consisting of: a predetermined time period, and a dynamic interval.

12. The wireless active suspension system of claim 1, further comprising:
    a wireless network.

13. The wireless active suspension system of claim 12, wherein said wireless network comprises:

a communications optimization to provide intelligent adjustment of at least one radio operation parameter from a group consisting of: a transmission power and a receiver sensitivity to optimize a battery life based on a link reliability, an interference potential, and an interference susceptibility.

14. The wireless active suspension system of claim 12, wherein said wireless network is a wireless mesh network.

15. The wireless active suspension system of claim 12, wherein said wireless network comprises:
   a first protocol for setup; and
   a second protocol for low latency.

16. The wireless active suspension system of claim 12, wherein said wireless network comprises:
   a single protocol with a dynamic parameter configured to adjust one or more parameters based on a real-time traffic communication versus a non-real-time traffic communication.

17. The wireless active suspension system of claim 12, wherein said wireless network comprises:
   a frequency-domain multiplexing to provide different logical transports for a real-time traffic communication versus a non-real-time traffic communication.

18. The wireless active suspension system of claim 12, wherein said wireless network comprises:
   a proximity protocol to pair at least two components coupled with said vehicle, said proximity protocol selected from a group consisting of: an acoustic technique and an ultrasonic technique.

19. The wireless active suspension system of claim 12, wherein said wireless network comprises:
   a communication interference resolution technique to maintain an intra-vehicle and an inter-vehicle communication capability in a busy environment.

20. The wireless active suspension system of claim 12, wherein said wireless network comprises a data minimization and a link scheduling to reduce a power consumption and a latency.

* * * * *